United States Patent
King et al.

(10) Patent No.: US 12,394,134 B2
(45) Date of Patent: Aug. 19, 2025

(54) TRANSFORMATION OF DATA IN A RAY TRACING SYSTEM

(71) Applicant: Imagination Technologies Limited, Kings Langley (GB)

(72) Inventors: Rostam King, Hertfordshire (GB); Gregory Clark, Hertfordshire (GB); Simon Fenney, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 155 days.

(21) Appl. No.: 17/850,707

(22) Filed: Jun. 27, 2022

(65) Prior Publication Data

US 2023/0031189 A1 Feb. 2, 2023

(30) Foreign Application Priority Data

Jun. 29, 2021 (GB) ..................................... 2109347

(51) Int. Cl.
*G06T 15/06* (2011.01)
(52) U.S. Cl.
CPC ................... *G06T 15/06* (2013.01)
(58) Field of Classification Search
CPC ...................................................... G06T 15/06
See application file for complete search history.

(56) References Cited

U.S. PATENT DOCUMENTS

| | | |
|---|---|---|
| 2007/0182732 A1 | 8/2007 | Woop et al. |
| 2017/0287202 A1 | 10/2017 | Wald et al. |
| 2021/0097750 A1 | 4/2021 | Woop et al. |
| 2022/0051466 A1* | 2/2022 | Doyle ...................... G06T 1/20 |

OTHER PUBLICATIONS

Ben's blog, "Affine transformations and their inverse", Nov. 26, 2011. https://negativeprobability.blogspot.com/2011/11/affine-transformations-and-their.html. (Year: 2011).*
Roth, "Ray casting for modeling solids," Computer Graphics and Image Processing, vol. 18, 1982, pp. 109-144.
Wald et al., "Distributed Interactive Ray Tracing of Dynamic Scenes," IEEE Symposium on Parallel and Large-Data Visualization and Graphics, Oct. 20, 2003.

* cited by examiner

*Primary Examiner* — Sing-Wai Wu
(74) *Attorney, Agent, or Firm* — Potomac Law Group, PLLC; Vincent M DeLuca

(57) ABSTRACT

A ray tracing system and method for processing data in which a forward transformation indication is received defining a transformation from a first space to a second space. A transformation is performed on input data from the second space to the first space to determine transformed data by performing a reverse translation operation on the input data, wherein the reverse translation operation is the reverse of a translation defined by the forward transformation indication. An inverse linear mapping operation is performed on the result of the reverse translation operation, wherein the inverse linear mapping operation is the inverse of a linear mapping defined by the forward transformation indication. The transformed data is processed in the ray tracing system.

20 Claims, 8 Drawing Sheets

| "Offset scale" from T | O¹: (X,Y,Z) | Reference result (X,Y,Z) | Errors: Traditional Method 'Absolute' | Relative (%) | Errors: 2-step method 'Absolute' | Relative (%) |
|---|---|---|---|---|---|---|
| 0 | -6139.630859, -918.4700928, 49161.50391 | 0.0, 0.0, 0.0 | 0.0004127, 0.0002366, 0.0001354 | INF, INF, INF | 0.000000, 0.000000, 0.000000 | 0.0, 0.0, 0.0 |
| 0.015625 | -6139.625977, -918.4761963, 49161.49219 | -0.00445417501, 0.008387505153, -0.0004866489908 | 0.0006085, 0.0002315, 0.0004978 | 13.68, 2.605, 102.3 | 0, 0, 1.1642e-10 | 0, 0, 2.392e-05 |
| 1.0 | -6139.314453, -918.8619385, 49160.64062 | -0.3450538516, 0.6320136285, -0.0596576333 | 0.0007854, 0.0008341, 0.0008394 | 0.2276, 0.1341, 1.407 | 0.0, 0.0, 0.0 | 0.0, 0.0, 0.0 |
| 16.0 | -6134.564941, -924.7398071, 49147.68359 | -5.525277615, 9.955883026, -0.955927966 | 0.001049, 0.0002193, 2.694e-05 | 0.01899, 0.002203, 0.002618 | 0.0, 0.0, 5.9605e-08 | 0.0, 0.0, 6.235e-06 |
| 256.0 | -6058.577148, -1018.7854, 48940.36328 | -88.41267395, 159.3013306, -15.299119 | 0.0007782, 6.104e-05, 0.0004234 | 0.0008802, 3.831e-05, 0.002768 | 0.0, 0.0, 1.907e-06 | 0.0, 0.0, 1.247e-05 |
| 4096 | -4642.774902, -2523.515381, 45823.25391 | -1414.602295, 2548.821533, -244.786377 | 0.001831, 0.001709, 0.0004578 | 0.0001294, 6.705e-05, 0.000187 | 0.0, 0.0, 1.526e-05 | 0.0, 0.0, 6.234e-06 |
| 65536 | 14610.06641, -26539.19727, -7450.483281 | -32833.63086, 40781.14453, -3916.579102 | 0.001953, 0.0, 0.0009766 | 8.629e-06, 0.0, 2.493e-05 | 0.0, 0.0, 0.0004383 | 0.0, 0.0, 1.247e-05 |
| 262144 | 76859.15625, -103641.375, -177286.4688 | -90534.53125, 163124.5781, -15666.31836 | 0.007812, 0.0, 0.0 | 8.629e-06, 0.0, 0.0 | 0.007812, 0.0, 0.0 | 8.629e-06, 0.0, 0.0 |
| 1048576 | 325865.5312, -411810.0938, -356630.375 | -362133.0938, 652498.3125, -62665.26562 | 0.0, 0.0, 0.0 | 0.0, 0.0, 0.0 | 0.0, 0.0, 0.007812 | 0.0, 0.0, 1.247e-05 |

FIGURE 7a

| "Offset scale" from T | O²ᵢ (X,Y,Z) | Reference result (X,Y,Z) | Errors : Traditional Method | | Errors: 2-step method | |
|---|---|---|---|---|---|---|
| | | | 'Absolute' | Relative (%) | 'Absolute' | Relative (%) |
| 0 | 2.952133179, 1.276896358, -44.61730194 | 0.0, 0.0, 0.0 | 3.585e-07, 1.3487e-08, 6.2641e-08 | INF, INF, INF | 0.0, 0.0, 0.0 | 0.0, 0.0, 0.0 |
| 0.015625 | 2.936855793, 1.27697837, -44.62057877 | 0.009879882213, 0.005543868057, -0.002280427841 | 3.446e-07, 2.1886e-08, 1.025e-06 | 0.003488, 0.0003948, 0.04496 | 8.3152e-10, 0.0, 0.0 | 9.427e-06, 0.0, 0.0 |
| 1.0 | 1.974361447, 1.282184482, -44.82699966 | 0.6323014498, 0.3548035026, -0.1459382325 | 4.768e-07, 2.98e-07, 5.811e-07 | 7.541e-05, 8.4e-05, 0.0003982 | 0.0, 0.0, 0.0 | 0.0, 0.0, 0.0 |
| 4.0 | -0.958873510, 1.298048975, -45.45609665 | 2.529305561, 1.419214249, -0.5837548971 | 2.384e-07, 0.0, 1.788e-07 | 9.427e-06, 0.0, 3.063e-05 | 0.0, 0.0, 0.0 | 0.0, 0.0, 0.0 |
| 16.0 | -12.69189358, 1.36150662, -47.9724884 | 10.11682129, 5.676857948, -2.335023403 | 0.0, 0.0, 4.768e-07 | 0.0, 0.0, 2.042e-05 | 9.537e-07, 0.0, 0.0 | 9.427e-06, 0.0, 0.0 |
| 64.0 | -58.62397585, 1.615338326, -58.03804016 | 40.46728516, 22.70742989, -9.340089798 | 0.0, 1.907e-06, 1.907e-06 | 0.0, 8.4e-06, 2.042e-05 | 3.815e-06, 0.0, 0.0 | 9.427e-06, 0.0, 0.0 |
| ⋮ | ⋮ | ⋮ | | | | |
| 1024 | -998.265564, 6.69196701, -259.3491211 | 647.4765625, 363.3138782, -149.4414366 | 0.0, 3.052e-05, 0.0 | 0.0, 8.4e-06, 0.0 | 6.104e-05, 0.0, 0.0 | 9.427e-06, 0.0, 0.0 |
| 4096 | -4001.918701, 22.93717957, -203.5446167 | 2569.90625, 1453.275635, -597.7657471 | 0.0002441, 0.0001221, 0.0 | 9.427e-06, 8.4e-06, 0.0 | 0.0002441, 0.0001221, 0.0 | 9.427e-06, 8.4e-06, 0.0 |

FIGURE 7b

| "Offset scale" from T | O² (X,Y,Z) | Reference result (X,Y,Z) | Errors: Traditional Method | | Errors: 2-step method | |
|---|---|---|---|---|---|---|
| | | | 'Absolute' | Relative (%) | 'Absolute' | Relative (%) |
| 0 | -12816.28125, 16287.14062, -115868.5312 | 0.0, 0.0, 0.0 | 0.007168, 0.007649, 0.00363 | INF INF INF | 0.0, 0.0, 0.0 | 0.0, 0.0, 0.0 |
| 0.015625 | -12816.29688, 16287.1377, -115868.5312 | -0.01134101208, 0.009710403159, 0.005467419378 | 0.004176, 0.002161, 0.009298 | 36.8, 22.26, 170.1 | 0.0, 0.0, 0.0 | 0.0, 0.0, 0.0 |
| 1.0 | -12817.25977, 16286.93262, -115868.5391 | -0.8319306374, 0.6525506973, 0.3810786307 | 0.01154, 0.003201, 0.003369 | 1.387, 0.4906, 0.6217 | 5.9605e-08, 0.0, 0.0 | 7.165e-06, 0.0, 0.0 |
| 16.0 | -12831.93066, 16283.81543, -115868.7109 | -13.4659729, 10.33145905, 5.924704075 | 0.02616, 0.01563, 0.02613 | 0.1942, 0.1513, 0.4411 | 0.0, 0.0, 4.768e-07 | 0.0, 0.0, 8.048e-06 |
| 256.0 | -13066.67676, 16233.94141, -115871.3828 | -215.3684692, 165.33815, 94.85584259 | 0.01704, 0.01103, 0.01736 | 0.007914, 0.006672, 0.0183 | 0.0, 0.0, 7.629e-0 | 0.0, 0.0, 8.043e-06 |
| 4096 | -16823.60352, 15435.95215, -115914.1094 | -3445.756592, 2645.498535, 1517.838989 | 0.009277, 0.005615, 0.01184 | 0.0002692, 0.0002123, 0.0007801 | 0.0, 0.0, 0.0 | 0.0, 0.0, 0.0 |
| 65536 | -76917.4375, 2668.128906, -116597.3281 | -55132.23438, 42327.87891, 24285.27148 | 0.007812, 0.01172, 0.001953 | 1.417e-05, 2.769e-05, 8.042e-06 | 0.003906, 0.0, 0.0 | 7.085e-06, 0.0, 0.0 |
| 262144 | -263228.9062, -38188.90625, -118785.7109 | -220528.9062, 169311.5312, 97141.10938 | 0.01562, 0.01562, 0.02344 | 7.085e-06, 9.229e-06, 2.413e-05 | 0.0, 0.0, 0.0 | 0.0, 0.0, 0.0 |
| 1048576 | -1038434.75, -201617.0469, -127537.2578 | -882115.6875, 677246.125, 388564.4375 | 0.0625, 0.0, 0.03125 | 7.085e-06, 0.0, 8.042e-06 | 0.0625, 0.0, 0.0 | 7.085e-06, 0.0, 0.0 |

FIGURE 7c

TRANSFORMATION OF DATA IN A RAY TRACING SYSTEM

FIELD

The present disclosure is directed to processing data in a ray tracing system. In particular, the present disclosure relates to transforming data between different spaces in a ray tracing system.

BACKGROUND

Ray tracing is a computational rendering technique for generating an image of a scene (e.g. a 3D scene) by tracing paths of light ('rays'), e.g. from the viewpoint of a camera through the scene. Each primary ray is modelled as originating from the camera and passing through a pixel into the scene. As a ray traverses the scene it may intersect objects within the scene. The interaction between a ray and an object it intersects can be modelled to create realistic visual effects. For example, in response to determining an intersection of a ray with an object, a shader program (i.e. a portion of computer code) may be executed in respect of the intersection. A programmer can write the shader program to define how the system reacts to the intersection which may, for example cause one or more secondary rays to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. The result of executing the shader program (and processing any relevant secondary rays) can be the calculation of a colour value for the pixel that the primary ray passed through.

Rendering an image of a scene using ray tracing may involve performing many intersection tests, e.g. billions of intersection tests for rendering an image of a scene. In order to reduce the number of intersection tests that need to be performed, ray tracing systems can generate acceleration structures, wherein each node of an acceleration structure represents a region within the scene. Acceleration structures are often hierarchical (e.g. having a tree structure) such that they include multiple levels of nodes, wherein nodes near the top of the acceleration structure represent relatively large regions in the scene (e.g. the root node may represent the whole scene), and nodes near the bottom of the acceleration structure represent relatively small regions in the scene. The acceleration structure can have different structures in different examples, e.g. a grid structure, an octree structure, a space partitioning structure (e.g. a k-d tree) or a bounding volume hierarchy. The nodes can represent suitable shapes or regions in the scene (which may be referred to herein as "boxes"). In some examples the nodes represent axis-aligned bounding boxes (AABBs) in the scene. Intersection testing can be performed for a ray (e.g. in a recursive manner) using the acceleration structure by first testing the ray for intersection with the root node of the acceleration structure. If the ray is found to intersect a parent node (e.g. the root node), testing can then proceed to the child nodes of that parent. In contrast, if the ray is found not to intersect a parent node, intersection testing of the child nodes of that parent node can be avoided, saving computational effort. If a ray is found to intersect a leaf node then it can be tested against the objects within the region represented by the leaf node to thereby determine which object(s) the ray intersects with. The use of an acceleration structure (rather than testing rays directly with objects in the scene) reduces the number of intersection tests that need to be performed, and simplifies the intersection tests. The intersection tests are simpler because the nodes of the acceleration structure represent basic shapes (e.g. axis-aligned bounding boxes or spheres) for which intersection tests are simpler than for more complex object shapes, e.g. defined in terms of triangular primitives for which the alignment relative to the axes of the coordinate system is not predetermined.

A hierarchical acceleration structure may comprise a top-level acceleration structure (TLAS) and one or more bottom-level acceleration structures (BLASs). A top-level acceleration structure comprises nodes representing respective regions defined in the world space of the scene to be rendered. The regions that are represented by the nodes of the top-level acceleration structure may be axis-aligned boxes whose edges are aligned to the axes of a world space coordinate system in which the world space is defined.

Instead of just two levels, a hierarchical acceleration structure could comprise N levels, e.g. a ternary system wherein the top-level structure may reference middle-level structures which, in turn, reference bottom-level structures. Each would still have transformation matrices, either explicit or constructed by multiplication of the matrices assigned to the multiple levels, but conceptually the same techniques for transforming data between different spaces could apply.

In some cases, an application may submit geometric data to be rendered that represents a geometric model, e.g. a complex object represented by many primitives. A geometric model is a collection of geometry, e.g. comprising a set of primitives. The geometric model can be defined in its own local coordinate system (which may be referred to herein as a "model space coordinate system"), and can be placed (or "instantiated") in the world space of the scene, one or more times, with a respective one or more unique affine transforms. The transform for an instance of the geometric model defines how to map the geometric model from the model space to determine a position and an orientation of the instance of the geometric model within the world space of the scene to be rendered. The application submitting an instance of a geometric model to be rendered by the ray tracing system will normally supply a forward transformation indication (e.g. a forward transformation matrix), which defines the model-to-world space transformation for the instance of the geometric model, so that the instance of the geometric model can be correctly positioned and oriented in the world space of the scene. A bottom-level acceleration structure can be used to represent a geometric model. The bottom-level acceleration structure (BLAS) comprises one or more nodes representing a respective one or more regions defined in the model space. Normally, the application submitting an instance of a geometric model to be rendered by the ray tracing system defines the set of triangles of the geometric model to be input into each BLAS. The ray tracing system can then build each BLAS with the input primitives that have been supplied by the application for that BLAS. The application will also normally define a set of instances (by specifying for each instance, a forward transformation indication and a reference to the appropriate BLAS) as an input to a TLAS building process. The respective one or more regions that are represented by the one or more nodes of the bottom-level acceleration structure may be axis-aligned boxes whose edges are aligned to the axes of the model space coordinate system in which the model space is defined.

Alternative bounding volumes may also be used, such as spheres or Oriented Bounding Boxes (OBBs).

A "tree node" of the TLAS references nodes at a lower level (which may be referred to as "child nodes") in the TLAS. A "leaf node" of the TLAS is not a parent node to any of the other nodes of the TLAS, i.e. a leaf node does not have child nodes in the TLAS. Some leaf nodes of the TLAS may reference one or more primitives (e.g. with a respective one or more pointers). In this way, leaf nodes of the TLAS may represent regions bounding one or more primitives in the scene. Primitives may be convex polygons such as triangles, and may be defined by defining positions of the vertices of the primitives in a world space of the scene to be rendered, and by defining attributes associated with the vertices, such as colour values or texture coordinates. Furthermore, some leaf nodes of the TLAS may reference one or more instances of BLASs (e.g. with a respective one or more pointers and a respective one or more forward transformation indications), wherein the BLASs contain primitives.

Intersection testing is performed for a ray against nodes of the TLAS, wherein if the ray is determined to intersect a tree node of the TLAS then it is tested for intersection with the child nodes of the intersected node. The nodes of the TLAS represent regions that are defined in the world space of the scene, and the ray is defined in the world space of the scene. If the ray is determined to intersect a leaf node of the TLAS then the ray is tested for intersection with any primitives or instances of BLASs that are referenced by the leaf node. So when the ray is determined to intersect a leaf node of the TLAS that references an instance of a BLAS the ray is then tested for intersection with the nodes of the BLAS (e.g. starting with the root node of the BLAS). As described above, the nodes of the BLAS represent regions that are defined in the model space of the geometric model represented by the BLAS. In order to perform intersection testing of the ray against nodes of an instance of the BLAS, the ray and the nodes of the BLAS need to be defined in the same space. Therefore, either the nodes of the BLAS are transformed into the world space or the ray is transformed into the model space of the geometric model represented by the BLAS. Since the nodes of the BLAS may represent regions that are axis-aligned boxes in the model space of the BLAS and may describe significant geometric data (in the model space) against which a given ray may be tested, it is generally preferable to transform the ray into the model space rather than transforming the nodes of the BLAS into the world space. Therefore, in some ray tracing systems, when a ray intersects a leaf node of the TLAS which references an instance of a BLAS, the ray is transformed into the model space of the BLAS so that intersection testing can be performed for the ray against the BLAS in the model space. Further, for other techniques using alternative bounding volumes, e.g. spheres, it may be very difficult to represent or test the volume if it were transformed into world space, and this is another reason for it being preferable to transform the ray into the model space rather than transforming the nodes of the BLAS into the world space.

The transformation operation for transforming rays into model spaces of instances of geometry represented by BLASs may be performed many times, so improving the efficiency of the transformation operation (e.g. in terms of reducing the latency, power consumption and/or silicon area) can be beneficial to the efficiency of the ray tracing system. The transformation operations may be performed in software (e.g. by executing computer code on a general purpose processing unit) or they may be performed in one or more dedicated hardware modules, e.g. using fixed function circuitry. Software implementations generally provide more flexibility because software is more easily altered after it is designed and/or created than hardware implementations are. However, hardware implementations generally provide more efficient implementations in terms of latency and power consumption, so if the desired functionality is known in advance (which is the case for the transformation operations), hardware implementations may be preferred over software implementations. When designing a hardware implementation of a transform unit of a ray tracing system for transforming data from one space to another space, there are generally competing aims of having: (i) a smaller size (i.e. smaller silicon area), (ii) a lower latency, and (iii) lower power consumption.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of processing data in a ray tracing system, the method comprising:
receiving a forward transformation indication defining a transformation from a first space to a second space;
performing a transformation on input data from the second space to the first space to determine transformed data by:
performing a reverse translation operation on the input data, wherein the reverse translation operation is the reverse of a translation defined by the forward transformation indication; and
performing an inverse linear mapping operation on the result of the reverse translation operation, wherein the inverse linear mapping operation is the inverse of a linear mapping defined by the forward transformation indication; and
processing the transformed data in the ray tracing system.

The second space may be a world space of a scene to be rendered and the first space may be a model space of a geometric model which is instanced within the scene.

The input data may represent a position in the second space, and the transformed data may represent a transformed position in the first space.

The input data may represent a ray origin of a ray in the second space.

The method may further comprise performing a transformation on a ray direction vector of the ray from the second space to the first space by performing the inverse linear mapping operation on the ray direction vector of the ray.

The linear mapping may comprise one or more of: (i) a rotation, (ii) a scaling, (iii) a reflection, and (iv) a shearing.

The forward transformation indication may comprise a forward transformation matrix defining the transformation from the first space to the second space.

The method may further comprise determining the inverse linear mapping operation by calculating the inverse of the linear mapping defined in the forward transformation indication.

Said processing the transformed data in the ray tracing system may comprise performing intersection testing using the transformed data for use in rendering an image of a scene.

The method may further comprise performing intersection testing on a ray against a top-level acceleration structure, wherein the top-level acceleration structure may comprise nodes representing respective regions defined in the world space, wherein a leaf node of the top-level acceleration structure may reference a bottom-level acceleration structure comprising one or more nodes representing a respective one or more regions defined in the model space, and wherein the input data may represent a ray origin of the ray in the world space. Said performing a transformation on the ray origin of the ray from the world space to the model space to thereby determine a transformed ray origin of the ray in the model space, may be performed in response to determining that the ray intersects the leaf node of the top-level acceleration structure. Said processing the transformed data in the ray tracing system may comprise performing intersection testing on the ray against the bottom-level acceleration structure using the transformed ray origin of the ray in the model space.

The respective regions that are represented by the nodes of the top-level acceleration structure may be axis-aligned boxes whose edges are aligned to the axes of a world space coordinate system in which the world space is defined, and wherein the respective one or more regions that are represented by the one or more nodes of the bottom-level acceleration structure may be axis-aligned boxes whose edges are aligned to the axes of a model space coordinate system in which the model space is defined.

The input data may represent a position of a light source in the second space.

There is provided a ray tracing system configured to receive a forward transformation indication defining a transformation from a first space to a second space, the ray tracing system comprising:
 a transform unit configured to perform a transformation on input data from the second space to the first space to determine transformed data by:
  performing a reverse translation operation on the input data, wherein the reverse translation operation is the reverse of a translation defined by the forward transformation indication; and
  performing an inverse linear mapping operation on the result of the reverse translation operation, wherein the inverse linear mapping operation is the inverse of a linear mapping defined by the forward transformation indication;
 wherein the ray tracing system is configured to process the transformed data.

The second space may be a world space of a scene to be rendered and the first space may be a model space of a geometric model which is instanced within the scene, wherein the input data may represent a ray origin of a ray in the world space, and wherein the transformed data may represent a transformed ray origin of the ray in the model space.

The transform unit may be further configured to perform a transformation on a ray direction vector of the ray from the world space to the model space by performing the inverse linear mapping operation on the ray direction vector of the ray.

The ray tracing system may comprise an intersection testing module which comprises the transform unit, wherein the intersection testing module may further comprise one or more intersection testing units configured to perform intersection testing using the transformed data for use in rendering an image of a scene.

The intersection testing module may be configured to perform intersection testing on the ray against a top-level acceleration structure, wherein the top-level acceleration structure may comprise nodes representing respective regions defined in the world space, wherein a leaf node of the top-level acceleration structure may reference a bottom-level acceleration structure comprising one or more nodes representing a respective one or more regions defined in the model space. The intersection testing module may be configured to cause the transform unit to transform the ray origin of the ray from the world space to the model space in response to determining that the ray intersects the leaf node of the top-level acceleration structure. The intersection testing module may be configured to perform intersection testing on the ray against the bottom-level acceleration structure using the transformed ray origin of the ray in the model space.

The respective regions that are represented by the nodes of the top-level acceleration structure may be axis-aligned boxes whose edges are aligned to the axes of a world space coordinate system in which the world space is defined, and wherein the respective one or more regions that are represented by the one or more nodes of the bottom-level acceleration structure may be axis-aligned boxes whose edges are aligned to the axes of a model space coordinate system in which the model space is defined.

The ray tracing system may further comprise processing logic configured to process intersection testing results to determine rendered values representing an image of a scene.

The ray tracing system may further comprise a processing module configured to:
 receive geometric data defining geometry in the scene; and
 generate a hierarchical acceleration structure based on the received geometric data for use in intersection testing.

The transform unit may be implemented in fixed function circuitry in the ray tracing system.

There is provided a method of manufacturing, using an integrated circuit manufacturing system, a ray tracing system as described herein, the method comprising:
 processing, using a layout processing system, a computer readable description of the ray tracing system so as to generate a circuit layout description of an integrated circuit embodying the ray tracing system; and
 manufacturing, using an integrated circuit generation system, the ray tracing system according to the circuit layout description.

There may be provided a method of processing data in a computing system such as a graphics processing system, the method comprising:
 receiving a forward transformation indication defining a transformation from a first space to a second space;
 performing a transformation on input data from the second space to the first space to determine transformed data by:
  performing a reverse translation operation on the input data, wherein the reverse translation operation is the reverse of a translation defined by the forward transformation indication; and
  performing an inverse linear mapping operation on the result of the reverse translation operation, wherein the inverse linear mapping operation is the inverse of a linear mapping defined by the forward transformation indication; and
 processing the transformed data in the computing system.

There is provided a ray tracing system configured to perform any of the methods described herein.

The ray tracing system may be embodied in hardware on an integrated circuit. There may be provided a method of manufacturing, at an integrated circuit manufacturing system, a ray tracing system. There may be provided an integrated circuit definition dataset that, when processed in an integrated circuit manufacturing system, configures the system to manufacture a ray tracing system. There may be provided a non-transitory computer readable storage medium having stored thereon a computer readable description of a ray tracing system that, when processed in an integrated circuit manufacturing system, causes the integrated circuit manufacturing system to manufacture an integrated circuit embodying a ray tracing system.

There may be provided an integrated circuit manufacturing system comprising: a non-transitory computer readable storage medium having stored thereon a computer readable description of the ray tracing system; a layout processing system configured to process the computer readable description so as to generate a circuit layout description of an integrated circuit embodying the ray tracing system; and an integrated circuit generation system configured to manufacture the ray tracing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 7a illustrates a table showing the results of transforming a first set of points using a first example matrix according to a traditional method and according to the two-step method described herein;

Figure 1:
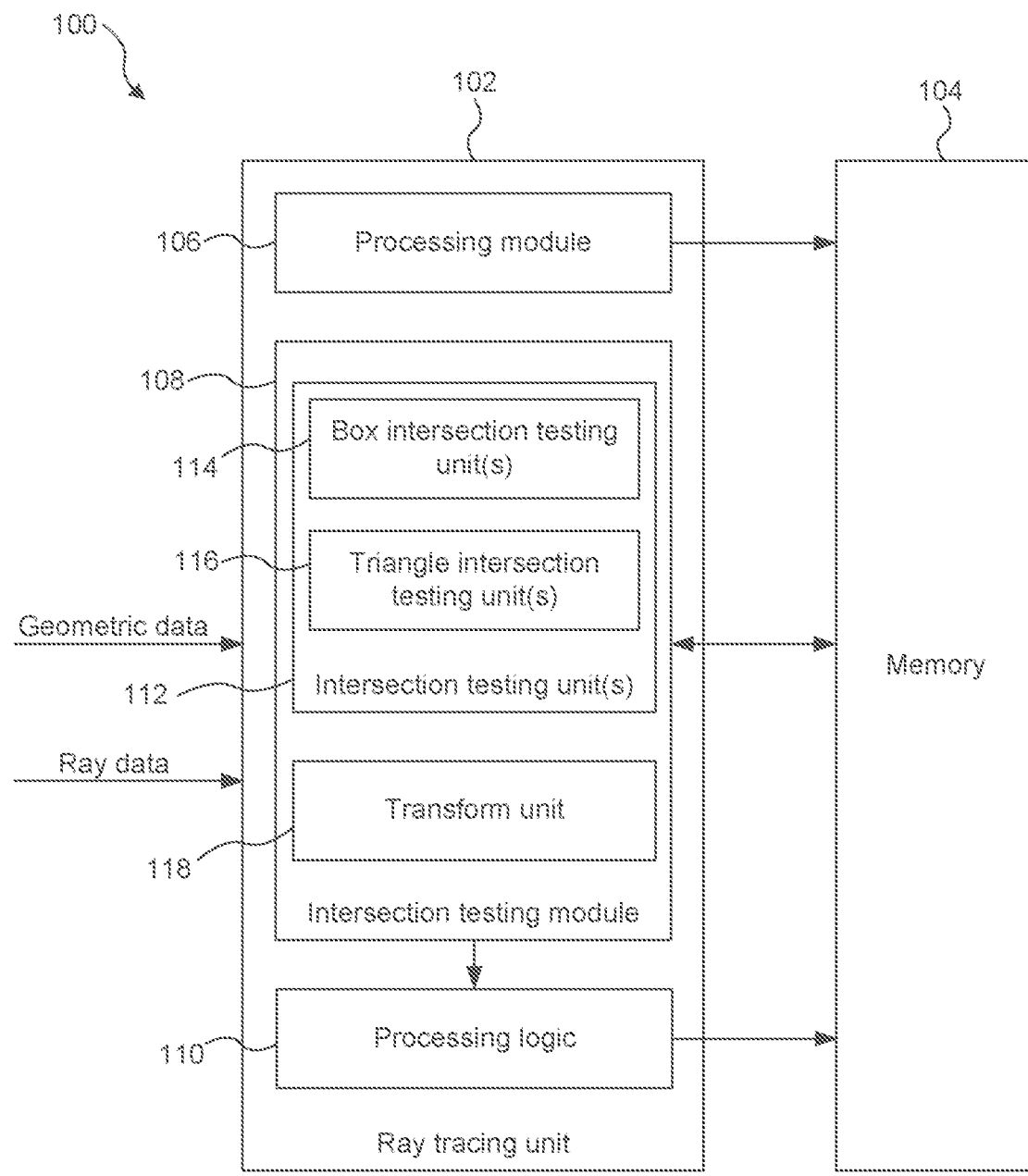
FIG. 1 shows a ray tracing system according to examples described herein.

7b illustrates a table showing the results of transforming a second set of points using a second example matrix according to a traditional method and according to the two-step method described herein; and

7c illustrates a table showing the results of transforming a third set of points using a third example matrix according to a traditional method and according to the two-step method described herein.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, in a ray tracing system, there may be situations in which a forward transformation indication is available which defines a transformation from a first space (e.g. model space) to a second space (e.g. world space), and in which input data (e.g. ray data) is to be transformed from the second space to the first space. For example, ray traversal (during intersection testing) takes place in the world space for a top-level acceleration structure (TLAS) and in the model space for a bottom-level acceleration structure (BLAS). A transition between the different coordinate systems occurs when a leaf node of the TLAS, containing an instanced BLAS, is intersected. The forward transformation indication defines a linear mapping (e.g. a rotation) and a translation to be performed to transform position data from the first space (e.g. model space) to the second space (e.g. world space). In examples described herein the forward transformation indication is a forward transformation matrix, and in order to perform the forward transformation on input data, the input data is multiplied by the forward transformation matrix.

Conventionally, if data (which may be referred to as "input data") is to be transformed from the second space (e.g. world space) to the first space (e.g. model space), an inverse of the forward transformation matrix would be calculated and then the data would be multiplied by the inverse transformation matrix. However, as explained in more detail below, this approach can result in errors. In particular, the format in which data values are represented limits the precision with which the data values can be specified. For example, if the data is in a floating point format then rounding errors can be introduced, and the absolute rounding errors tend to be greater for data values of larger magnitude.

However, in examples described herein, the inversion of the forward transformation matrix is decomposed into (inverse) translation, followed by (inverse) linear mapping. The inverse translation is simple to calculate because it is just the opposite (i.e. negative) of the forward translation defined by the forward transformation matrix. So no error is introduced in determining the translation part of the inverse transformation (e.g. this can just involve flipping the sign bits of the relevant values of the forward transformation matrix). Furthermore, in some examples the linear mapping defined by the forward transformation matrix may just be a rotation, and it is noted that the inverse of a pure rotation matrix is simply the transpose of the rotation matrix. Calculating the transpose of such a matrix is simple, and in particular it does not involve performing any numerical operations (e.g. division operations). So, in this example, by splitting the inverse transformation up into an inverse translation followed by an inverse linear mapping (e.g. inverse rotation), the accuracy of the inverse transformation can be increased. Furthermore, it may be simpler to calculate the inverse translation and the inverse linear mapping separately than to calculate the combined inverse transformation matrix. For example, the translation coefficients of the inverse transformation matrix would generally require operations to compute, and separating the translation components out replaces these operations with a sign change, which is very simple to implement.

As explained in detail below, the standard approach for expressing a transformation matrix in computer graphics, e.g. for a forward transformation matrix, M, that performs model-to-world space transformations, can be expressed as M=TR, where R is a linear mapping operation and T is a translation, as can be directly written as $$M = \begin{bmatrix} R_{00} & R_{01} & R_{02} & T_0 \\ R_{10} & R_{11} & R_{12} & T_1 \\ R_{20} & R_{21} & R_{22} & T_2 \\ 0 & 0 & 0 & 1 \end{bmatrix}$$

i.e. since $M = TR = \begin{bmatrix} 1 & 0 & 0 & T_0 \\ 0 & 1 & 0 & T_1 \\ 0 & 0 & 1 & T_2 \\ 0 & 0 & 0 & 1 \end{bmatrix} \begin{bmatrix} R_{00} & R_{01} & R_{02} & 0 \\ R_{10} & R_{11} & R_{12} & 0 \\ R_{20} & R_{21} & R_{22} & 0 \\ 0 & 0 & 0 & 1 \end{bmatrix}$ Such a matrix performs world-to-model space transformations, such as $MV_{model}=V_{world}$, where $V_{model}$ & $V_{world}$ are corresponding homogeneous (column) vectors in a given model-space and the world-space respectively.

This may be expressed instead using the transpose of this matrix form along with row vectors. It is trivial mapping, well known in the art, to convert from one form to the other.

The standard inverse transformation matrix, $M^{-1}$, for performing a mapping from world space to the given model space, i.e. as $M^{-1}V_{world}=V_{model}$, can also be expressed in the same form, i.e, $$M^{-1} = \begin{bmatrix} s_{00} & s_{01} & s_{02} & u_0 \\ s_{10} & s_{11} & s_{12} & u_1 \\ s_{20} & s_{21} & s_{22} & u_2 \\ 0 & 0 & 0 & 1 \end{bmatrix}$$

which is equivalent to $M^{-1}=US$, i.e. applying a linear mapping operation, S, followed by a translation U.

This inverse matrix can be determined as $M^{-1}=(TR)^{-1}=R^{-1}T^{-1}$, where $R^{-1}$ is the inverse of R, and $T^{-1}$ is the inverse of T. It is noted that if the inverse transformation matrix $M^{-1}$ is calculated in advance it is done by multiplying $R^{-1}\{=S\}$ and $T^{-1}$ (as $R^{-1}T^{-1}$) i.e., $$ST^{-1} = R^{-1}T^{-1} = \begin{bmatrix} r_{00} & r_{01} & r_{02} & 0 \\ r_{10} & r_{11} & r_{12} & 0 \\ r_{20} & r_{21} & r_{22} & 0 \\ 0 & 0 & 0 & 1 \end{bmatrix} \begin{bmatrix} 1 & 0 & 0 & -T_0 \\ 0 & 1 & 0 & -T_1 \\ 0 & 0 & 1 & -T_2 \\ 0 & 0 & 0 & 1 \end{bmatrix} = \begin{bmatrix} s_{00} & s_{01} & s_{02} & u_0 \\ s_{10} & s_{11} & s_{12} & u_1 \\ s_{20} & s_{21} & s_{22} & u_2 \\ 0 & 0 & 0 & 1 \end{bmatrix}$$

where $R^{-1} = \begin{bmatrix} r_{00} & r_{01} & r_{02} & 0 \\ r_{10} & r_{11} & r_{12} & 0 \\ r_{20} & r_{21} & r_{22} & 0 \\ 0 & 0 & 0 & 1 \end{bmatrix}$ Note that the fourth column "$u_i$" (representing a translation performed after S has been applied) is generated by multiplying the inverse linear mapping operation $R^{-1}$ {i.e. S} by the negated model-to-world translation vector.

Having the standard transformation matrix is obviously beneficial in terms of familiarity and also of having standardised matrix-vector and matrix-matrix multiplication functions and/or hardware units. Further, consider the popularity, in both CPUs and dedicated hardware, of Fused-Multiply-Addition (FMA) units, i.e. computing A*B+C. An FMA is both cheaper, in terms of hardware, and more accurate than the equivalent implemented with separate floating-point multiply and adder units. It can also be appreciated that a matrix-vector multiply, using the standard form, can be achieved with a mere 9 FMA instructions. Further these 9 operations require minimal temporary storage for intermediate results.

Despite these benefits, the inventors have realised that there are some disadvantages with the standard approach. If the standard form for the inverse matrix is not used but, instead, the inverse translation and the inverse linear mapping are retained separately, there is no need to perform the multiplication of $R^{-1}$ by the negated model-to-world translation vector. If $M^{-1}$ were pre-computed and stored, then a small saving is achieved by using the separated formulation, but if it were to be computed dynamically, the cost savings could be significant, leading to reductions in latency, power consumption and/or silicon area of a transform unit that performs the transformations.

More significantly, however, it was appreciated that, in practice, using the two-step, separated form for the inverse calculations (as described in examples herein) leads to superior accuracy. Although the two representations, when considered as operations over the set of reals, i.e., $\mathbb{R}$, are identical, as noted earlier, floating-point maths in computers is only an approximation to $\mathbb{R}$ and each operation typically introduces rounding errors.

In practice, any 3D model that is to be instanced in a scene, will be generally centred near the origin of its local coordinate space. This is partly because absolute floating-point precision increases as values approach 0.0, but, pragmatically, also possibly because modelling packages used by content developers will usually default to creating objects on or near the local origin.

Consider now the placement of such a local-space 3D object into world space, via instancing. This is, in effect, performed by the application of the local-to-world matrix, M, which, as noted earlier, comprises the application of a linear mapping R followed by a translation, T. The linear mapping R, (e.g. combinations of rotation/scaling/skewing etc) has no effect on the local origin. When the translation is applied, it will be clear that the origin of the 3D object will now be located at "T" in world space. Given the expectation that the 3D model is concentrated around its local origin, in world-space the model should typically thus be concentrated in the vicinity of "T".

In a ray tracing system, when rays are tested against primitives and bounding volumes, it is preferable to have those intersection tests performed accurately. Clearly, if rays are located near or are meant to hit an object, it is more important to achieve precise results. Conversely, if a ray will miss an object by a considerable margin, then precision is not so important.

As noted, the test of a ray against an instanced object may be performed by transforming the ray by the inverse, i.e. world-to-local, transformation to create a "local-space" version of the ray and then test this against the local-space object. The "local" space may be referred to herein as the "model" space. As will be noted later, there are two principal components to a "ray", these being a direction vector and an origin vector. The former is not affected by translation and so the operations to map from world to local space would be identical for both the standard matrix form and the two-step/separated form. The transformation of the origin, however, does depend on the translation part and so accuracy of the two schemes may differ.

Consider the classes of rays known as secondary rays, e.g. shadow, reflection, refraction, or ambient occlusion sampling rays. Each will have an origin, expressed in world space, that usually represents a position of a point on or near a surface of an (instanced) object. Further, there is a significant chance that these rays will also need to be tested against further geometry that belongs to the same instanced object. If we assume the origin of the instanced object is "T" in world space, (i.e. the translation component of the local-to-world matrix) it is thus likely that such rays will have origins that are "in the vicinity of T".

A statistical approach can be taken to compare the results of using the standard approach and the two-step approach described herein in terms of accuracy versus a 'reference' method using a chosen reference precision, e.g., 128-bit floating-point. For example, in a given test set, j, a random linear mapping matrix $R^j$ (and corresponding inverse $S^j$), a random translation, $T^j$, and a set of random world space positions, $O_i^j$, at increasing distances from $T^j$ can be generated. Each of these random positions, $O_i^j$, may be considered a potential ray origin, and can be transformed using, as an example, single-precision floating-point, from world to local space using either the standard (inverse) transformation matrix or the two-step method described herein. To evaluate accuracy, these results can be compared to a standard approach implemented with the reference (128 bit) precision.

The table shown in FIG. 7a shows the results of transforming a first set of points using a first example matrix, $M^1$, generated with:
1) Rotation around an axis [−0.484658, 0.310767, −0.817637] by 166 degrees followed by
2) Scaling by [5.062899, 1.343523, 1.331195] followed by
3) Translation ($T^1$) by [−6139.630859, −918.470093, 49161.503906]

In this example, the inverse matrix, $(M^1)^{-1}$, in standard form is (approximately)

$$\begin{bmatrix} -0.100236 & -0.368108 & 0.530048 & -27011.443359 \\ -0.0195445 & -0.580572 & -0.464163 & 22165.703125 \\ 0.169065 & -0.28563 & 0.260598 & -12035.484375 \\ 0 & 0 & 0 & 1 \end{bmatrix}$$

A set of points, $O_i^1$ chosen in world space and positioned with increasing offsets from the translation vector are then transformed with 3 different methods: (i) a 128-bit precision reference implementation (with final results rounded to single precision), (ii) the traditional method using single precision float-pointing maths (utilising FMA), and (iii) the two step-method using single precision. The errors, both in absolute and relative terms, for the last two modes compared to the reference are shown in the table in FIG. 7a.

The table shown in FIG. 7b shows the results of transforming a second set of points using a second example matrix, $M^2$, generated with:

1) Rotation about the [0.506287, 0.219681, 0.833915] by 328 degrees followed by
2) Scaling by [−1.337073, −0.625314, 1.900729] followed by
3) Translation ($T^2$) by [2.952133, 1.276896, −44.617302]

The inverse of the matrix, $(M^2)^{-1}$, in standard form is (approximately)

$$\begin{bmatrix} -0.663388 & 0.679670 & 0.094999 & 5.329140 \\ -0.343143 & -1.367923 & -0.126506 & -2.884673 \\ 0.039085 & -0.473567 & 0.501764 & 22.876669 \\ 0 & 0 & 0 & 1 \end{bmatrix}$$

The table shown in FIG. 7c shows the results of transforming a third set of points using a third example matrix, $M^3$, generated with:
1) Rotation about the axis [−0.490687, 0.033258, −0.870701] by 243 degrees followed by
2) Scaling by [4.662860, 0.188493, 0.213617] followed by
3) Translation ($T^3$) by [−12816.281250, 16287.140625, −115868.531250]

along with a set of points, is shown in Table 3.

From the results shown in the tables in FIGS. 7a, 7b and 7c, it can be seen that the accuracy of the two step method is far superior (i.e. the relative error is smaller) compared to the traditional method for points near the origin of the model. This is particularly the case where the translation performed in the original model-to-world translation is not small. For example, it is noted that the relative error of the traditional method can be extremely large. Although, as a point moves much further away from the model origin the errors of both methods become similar, as noted above, these cases are expected to be infrequent.

FIG. 1 shows a ray tracing system 100 comprising a ray tracing unit 102 and a memory 104. The ray tracing unit 102 comprises a processing module 106, an intersection testing module 108 and processing logic 110. The intersection testing module 108 comprises one or more intersection testing units 112. In particular, the one or more intersection testing units 112 comprises one or more box intersection testing units 114 and one or more triangle intersection testing units 116. The intersection testing module 108 also comprises a transform unit 118. In some examples the intersection testing module 108 may also include one or more procedural tester units (not shown in FIG. 1) for performing intersection testing with respect to procedural primitives.

Figure 2:
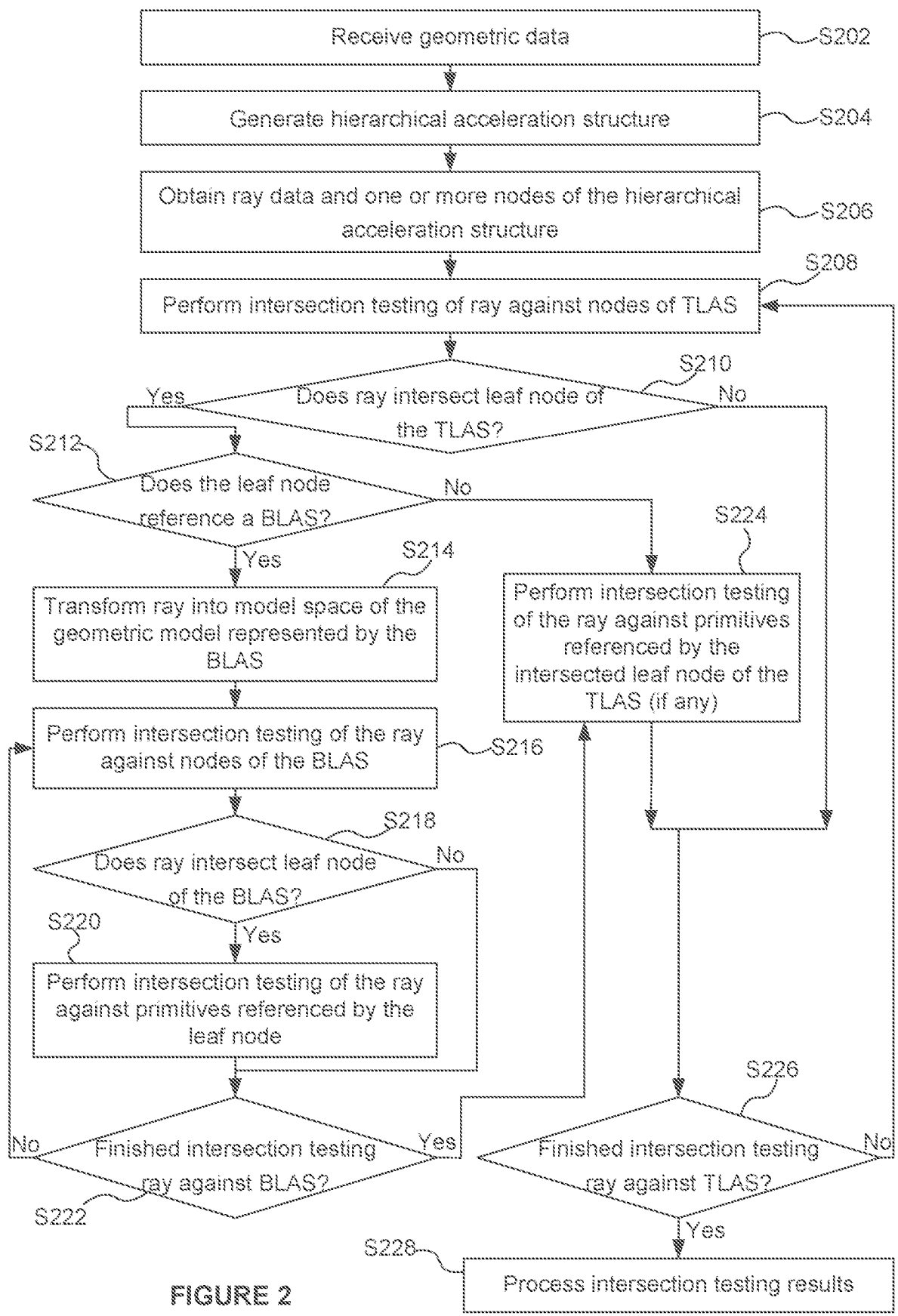
FIG. 2 shows a flow chart for a method of processing data in a ray tracing system according to examples described herein.

FIG. 2 is a flow chart for a method of processing data in the ray tracing system 100 according to examples described herein. An application can submit geometric data defining geometry within a scene to the ray tracing system so that the ray tracing system can render an image of the scene. The geometric data may comprise definitions of primitives, e.g. defining positions of primitive vertices in the world space of the scene. The geometric data may comprise data representing a geometric model which can be instanced one or more times in the scene. For example, the geometric data may comprise a set of primitives to be input into each bottom-level acceleration structure (BLAS), wherein the processing module 106 can build the respective BLAS for each geometric model. For each instance of a geometric model, the application can also submit a reference to the corresponding BLAS along with an indication of a forward transformation to place the instance of the geometric model in world space.

The data representing a geometric model may comprise a bottom-level acceleration structure (BLAS) which comprises nodes representing regions defined in a model space, wherein leaf nodes of the BLAS contain references to primitives which may be defined using positions of vertices in the model space of the geometric model. Instances of a geometric model may be placed, possibly multiple times, within the scene in accordance with respective forward transformation indications that are supplied by the application for the instances of the geometric model. In examples described herein the forward transformation indication is a forward transformation matrix. As described above, the forward transformation matrix for an instance of a geometric model defines a transformation from the model space of the geometric model to the world space of the scene for that instance of the geometric model. An inverse transformation indication may not be needed by the ray tracing unit (e.g. if the geometric model was transformed into the world space for an instance of that geometric model so that all of the intersection testing is performed in the world space of the scene) and, in any case, the inverse transformation is derivable from the forward transformation indication (assuming the inverse transformation is valid). Since the inverse transformation is not always needed, the standard specifications which define how the application should submit data to the ray tracing system do not require the application to supply an inverse transformation indication (i.e. an indication of a transformation from the world space to the model space of the instance of geometry), and therefore the application will not normally supply an inverse transformation indication because doing so may increase the amount of data that needs to be generated by the application and supplied to the ray tracing system. However, as described above, in examples described herein, when intersection testing is to be performed for a ray against a BLAS, the ray is transformed into the model space of the geometric model represented by the BLAS. This is because it can improve the efficiency of the intersection testing to have nodes of the BLAS representing regions that are axis-aligned boxes in the coordinate system in which the intersection testing is carried out. Since there is no computational benefit from mapping axis-aligned boxes in model space to world space, and since the geometry that the BLAS describes may be complex and expensive to transform into world space, it is generally preferable to transform the ray into model space rather than transform the nodes of the BLAS into world space. Furthermore, as well as testing rays for intersection with AABBs representing nodes of the BLAS, rays are tested for intersection with triangles and/or procedural geometry referenced by the BLAS. Transforming triangles from model space into world space may be an expensive operation (compared to transforming rays from world space into model space), and intersection tests with procedural geometry are defined by software code written by a user of the system, so there is no guarantee that these intersection tests could be transformed into world space. So again, it is generally preferable to transform the ray into the model space of the BLAS rather than transform the nodes of the BLAS into world space.

In step S202 the ray tracing unit 102 receives the geometric data (e.g. submitted by an application) defining geometry in the scene to be rendered. The scene may be a 3D scene. In step S204 the processing module 106 generates a hierarchical acceleration structure based on the received geometric data. As described above, the hierarchical acceleration structure may comprise a top-level acceleration structure (TLAS) and one or more bottom-level acceleration structures (BLASs), wherein a BLAS is referenced by one or more leaf nodes of the TLAS. It is noted that multiple instances of a geometric model can reference the same BLAS representing that geometric model. In this case, step S204 may involve generating the leaf nodes of the TLAS which bound BLASs and/or primitives in the scene, and then generating the nodes of the TLAS above the leaf nodes in a bottom-up manner to create the hierarchical acceleration structure. In other examples, the leaf nodes of the TLAS which bound BLASs and/or primitives in the scene can be generated and then a top-down partitioning of the scene space could be performed to create the hierarchical acceleration structure. In examples described herein, nodes of the TLAS are AABBs in world space, and nodes of a BLAS representing a geometric model are AABBs in the model space of the geometric model. Methods for building the nodes of the TLAS are known in the art and the details of these methods are beyond the scope of this disclosure. As described in more detail below, the hierarchical acceleration structure is for use in intersection testing. The hierarchical acceleration structure can be stored in the memory 104 at the end of step S204. For each reference to a BLAS, a transformation indication can be stored with the hierarchical acceleration structure. In general, the "transformation indication" for the BLAS can be any information which can be used to determine a transformation from the world space to the model space of the BLAS. For example, the transformation indication may be the forward transformation matrix, M, supplied by the application which submitted the geometry. Alternatively, the transformation indication for the BLAS may comprise the values of R and T, or may comprise the values of $R^{-1}$ and $T^{-1}$. If the values of $R^{-1}$ and $T^{-1}$ are to be stored then the processing module 106 can calculate these values by finding the inverses of R and T respectively.

In some examples, the ray tracing unit does not perform steps S202 and S204 to generate and store the hierarchical acceleration structure in the memory 104, and instead the hierarchical acceleration may be written into the memory 104 by another entity, e.g. by the application which submits the geometric data for the scene to be rendered.

In step S206 the ray tracing unit 102 (in particular the intersection testing module 108) obtains ray data defining rays that are to be tested for intersection. The ray data may comprise a ray origin and a ray direction vector (defined in the world space of the scene to be rendered) and may comprise other data relating to the ray such as minimum and maximum culling distances. The rays may be primary rays or secondary rays. For example, a ray (r) can be defined as r=O+Dt where O is a vector which represents the ray origin, D is a vector which represents the ray direction and t represents a distance along the ray from the origin. Furthermore, in step S206 the intersection testing module 108 retrieves nodes (comprising data defining the axis-aligned boxes corresponding to the nodes) of the hierarchical acceleration structure from the memory 104. To avoid reading in the whole acceleration structure at a time, the intersection testing module 108 retrieves a subset of the boxes from one level of the acceleration structure from memory 104 at each stage, based on the results of previous intersection tests. As described above, the upper levels of the hierarchical acceleration structure comprise nodes of a TLAS which represent axis-aligned boxes in the world space, and one or more leaf nodes of the TLAS reference a BLAS. A BLAS represents a geometric model which can be instantiated one or more times in the scene, and the nodes of the BLAS represent axis-aligned boxes in the model space of the geometric model. When a BLAS of the acceleration structure is read for an instance of the geometric model represented by the BLAS, the ray tracing unit 102 (e.g. the intersection testing module 108) also receives the transformation indication for the instance of the BLAS that was stored with the hierarchical acceleration structure in step S204. As described above, the transformation indication for the instance of the BLAS may be a forward transformation indication (e.g. a forward transformation matrix) defining a transformation for the instance of the geometric model represented by the BLAS from the model space to the world space. Alternatively, the transformation indication for the instance of the BLAS may comprise the values of R and T, or may comprise the values of $R^{-1}$ and $T^{-1}$, or may comprise values of $(TR)^{-1}$. More generally, the transformation indication for the instance of the BLAS can be any information which can be used to determine a transformation from the world space to the model space of the BLAS.

In step S208, the box intersection testing unit(s) 114 performs intersection tests to determine whether or not a ray intersects bounding boxes corresponding to nodes of the TLAS. A person skilled in the art would be aware of methods for performing an intersection test for a ray with respect to an axis aligned box, and the details of this intersection testing are beyond the scope of this disclosure, other than to say that the intersection testing process is more efficient if the ray and the box are defined in the same coordinate system and if the edges of the box are aligned to the axes of the coordinate system. The ray is initially tested for intersection with the root node of the TLAS. If it is determined that a ray intersects a tree node (e.g. the root node) of the TLAS then the ray is tested for intersection with the child nodes of the tree node. If it is determined that a ray misses a particular node of the TLAS then the ray does not need to be tested for intersection with any descendent nodes (e.g. child nodes or grandchild nodes, etc.) of the particular node, so the determination that a ray misses a node can cull vast swathes of the hierarchical acceleration structure from the intersection testing process for the ray. For clarity of description, the examples described herein relate to performing intersection testing for a single ray, but it is to be understood that in practice intersection testing may be performed for multiple rays in parallel.

In step S210 the box intersection testing unit(s) 114 determines whether the ray intersects a leaf node of the TLAS. If it is determined, in step S210, that the ray does not intersect a leaf node of the TLAS then the method passes to step S226 which is described below. If it is determined, in step S210, that the ray does intersect a leaf node of the TLAS then the method passes to step S212.

In step S212 the box intersection testing unit(s) 114 determines whether the intersected leaf node references a BLAS, i.e. whether the intersected leaf node includes an instance of a BLAS. If it is determined, in step S212, that the intersected leaf node does not reference a BLAS then the method passes to step S224 which is described below. If it is determined, in step S212, that the intersected leaf node does reference a BLAS then the method passes to step S214.

In step S214 the transform unit 118 transforms the ray from the world space into the model space of the instance of geometry represented by the BLAS. In particular the ray origin and ray direction vector of the ray are transformed from the world space into the model space. The transformation indication for the instance of the BLAS that was received in step S206 is used to determine how to transform the ray from the world space into the model space of the geometric model represented by the BLAS. The transformation might not affect other data relating to the ray, e.g. the minimum and maximum culling distances of the ray. Details of how this transformation is performed are described below with reference to FIG. 4.

In step S216, the box intersection testing unit(s) 114 performs intersection tests to determine whether or not a ray intersects bounding boxes corresponding to nodes of the BLAS. As mentioned above, a person skilled in the art would be aware of methods for performing an intersection test for a ray with respect to an axis aligned box. The axis aligned boxes represented by the nodes of the BLAS have edges that are aligned to the axes of the model space of the geometric model represented by the BLAS. Furthermore, the (transformed) ray is also defined in the model space. The ray is initially tested for intersection with the root node of the BLAS. If it is determined that the ray intersects a tree node (e.g. the root node) of the BLAS then the ray is tested for intersection with the child nodes of the tree node. If it is determined that a ray misses a particular node of the BLAS then the ray does not need to be tested for intersection with any descendent nodes (e.g. child nodes or grandchild nodes, etc.) of the particular node.

In step S218 the box intersection testing unit(s) 114 determines whether the ray intersects a leaf node of the BLAS. If it is determined, in step S218, that the ray does not intersect a leaf node of the BLAS then the method passes to step S222 which is described below. If it is determined, in step S218, that the ray does intersect a leaf node of the BLAS then the method passes to step S220.

In step S220 the triangle intersection testing unit(s) 116 performs one or more triangle intersection tests to determine which object(s) (if any) the ray intersects. In particular, the triangle intersection testing unit(s) 116 performs intersection testing of the ray against primitives referenced by the intersected leaf node of the BLAS. In this example, the primitives are triangles, but in other examples the primitives could be other convex polygons, spheres, or procedural primitives. A person skilled in the art would be aware of methods for performing an intersection test for a ray with respect to a primitive, and the details of this intersection testing are beyond the scope of this disclosure. In step S220, the intersection testing is performed between primitives defined in the model space which are part of the BLAS, and the transformed ray which is defined in model space. The results of the intersection tests indicate which object(s) in the scene a ray intersects, and the results may also indicate a position on the object at which the ray intersects the object (e.g. using barycentric coordinates of an intersection point on a primitive of the object), and may also indicate a distance along the ray that the intersection occurs (e.g. an indication of the distance from the ray origin to the intersection point). As mentioned above, a ray (r) can be defined as r=O+Dt where O is a vector which represents the ray origin, D is a vector which represents the ray direction and t represents a distance along the ray from the origin, so the value of t at the intersection point can be used as the indication of the distance along the ray that the intersection occurs.

In step S222, the intersection testing module 108 determines whether the intersection testing of the ray against the BLAS has finished. If it has not yet finished, then the method passes back to step S216 so that intersection testing of the ray against nodes of the BLAS can continue. However, if it is determined in step S222 that the intersection testing of the ray against the BLAS has finished then the method passes to step S224. In some examples, the data for the transformed ray may be stored (e.g. in a cache) while the BLAS is tested. In other examples, the data for the transformed ray might not be stored while the BLAS is tested, and instead the ray data can be transformed each time the ray is to be tested against a node of the BLAS. Storing the transformed ray data will reduce the number of transformation operations that need to be performed, but it will increase the amount of data that is stored in a memory (e.g. in a cache) during the intersection testing process. Passing the transformed ray data to and from a memory may (or may not) be slower than recalculating the transformed ray data each time it is needed, and storing the transformed ray data increases the need for memory on the ray tracing unit, which may increase the size (i.e. the silicon area) of the ray tracing unit. As such, whether or not to store the transformed ray data while the BLAS is tested is an implementation choice that may be different for different implementations.

The method may arrive at step S224 from step S212 or from step S222. For example, as mentioned above, if in step S212 it is determined that an intersected leaf node of the TLAS does not reference a BLAS then the method passes from step S212 to step S224. Furthermore, an intersected leaf node of the TLAS may reference a BLAS and one or more primitives, so the method can pass from step S222 to step S224, although it is noted that an intersected leaf node of the TLAS may reference a BLAS and not reference any primitives, so if the method arrives at step S224 from step S222 it is possible that there are no primitives referenced by the intersected leaf node of the TLAS such that step S224 does not involve any processing. However, if the intersected leaf node of the TLAS does reference one or more primitives, then in step S224 the triangle intersection testing unit(s) 116 performs one or more triangle intersection tests to determine which object(s) (if any) the ray intersects. In particular, the triangle intersection testing unit(s) 116 performs intersection testing of the ray against primitives referenced by the intersected leaf node of the TLAS. In this example, the primitives are triangles, but in other examples the primitives could be other convex polygons, spheres or procedural primitives. A person skilled in the art would be aware of methods for performing an intersection test for a ray with respect to a primitive, and the details of this intersection testing are beyond the scope of this disclosure. In step S224, the intersection testing is performed between primitives defined in the world space and the (untransformed) ray which is defined in world space. The results of the intersection tests indicate which object(s) in the scene a ray intersects, and the results may also indicate a position on the object at which the ray intersects the object (e.g. using barycentric coordinates of an intersection point on a primitive of the object), and may also indicate a distance along the ray that the intersection occurs (e.g. an indication of the distance from the ray origin to the intersection point). The value of t at the intersection point can be used as the indication of the distance along the ray that the intersection occurs.

Following step S224 the method passes to step S226. So the method may arrive at step S226 either from step S224 or from step S210 (in response to determining that the ray has not intersected a leaf node of the TLAS). In step S226, the intersection testing module 108 determines whether the intersection testing of the ray against the TLAS has finished. If it has not yet finished, then the method passes back to step S208 so that intersection testing of the ray against nodes of the TLAS can continue. However, if it is determined in step S226 that the intersection testing of the ray against the TLAS has finished then the intersection testing module 108 outputs results of the intersection testing process, e.g. to the processing logic 110. If the intersection testing process for the ray has determined more than one intersection of the ray with geometry in the scene then the intersection testing module 108 may determine which of the intersections has the smallest intersection distance and may report (e.g. to the processing logic 110) that intersection as the "closest hit" for the ray. In other examples, the intersection testing module 108 may report (e.g. to the processing logic 110) all of the determined intersections for the ray. The method then passes to step S228.

In step S228 the results of the intersection testing performed for the ray are processed by the processing logic 110. The processing logic 110 is configured to process the results of the intersection testing to determine rendered values representing an image of the 3D scene. The rendered values determined by the processing logic 110 can be passed back to the memory 104 for storage therein to represent the image of the 3D scene.

Figure 3A:
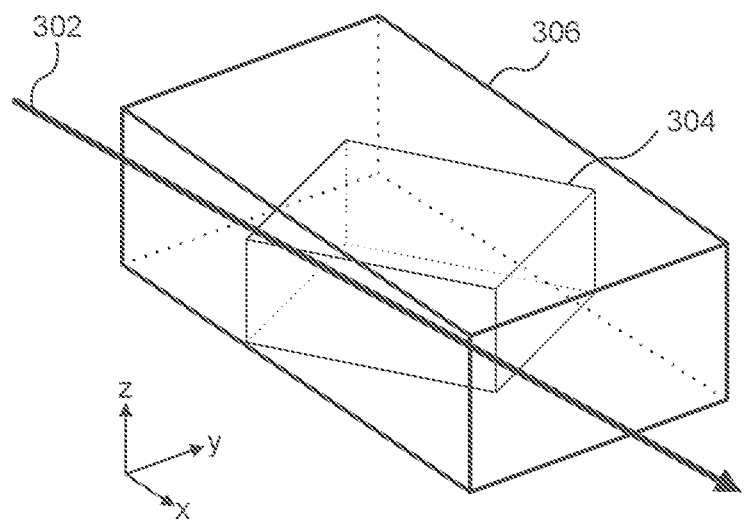
FIG. 3a shows a ray passing through a region represented by an instance of a BLAS within a region represented by a leaf node of a TLAS, and shows the axes of a world space coordinate system in which the TLAS is defined.
Figure 3B:
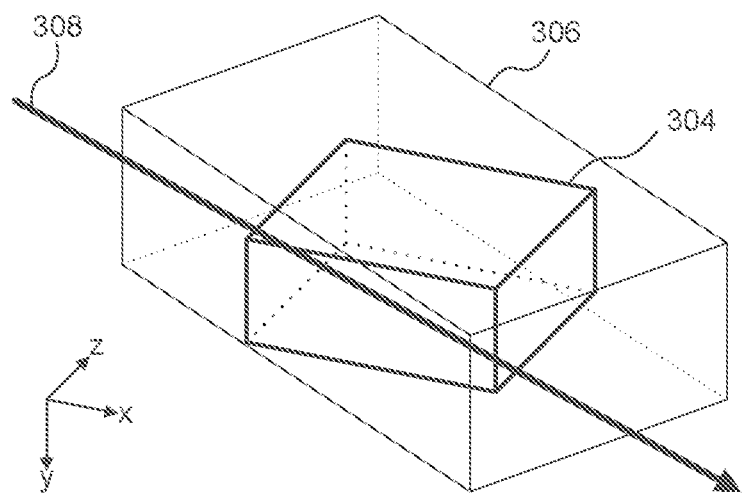
FIG. 3b shows the ray passing through the region represented by the instance of the BLAS within the region represented by the leaf node of the TLAS, and shows the axes of a model space coordinate system in which the BLAS is defined.
Figure 4:
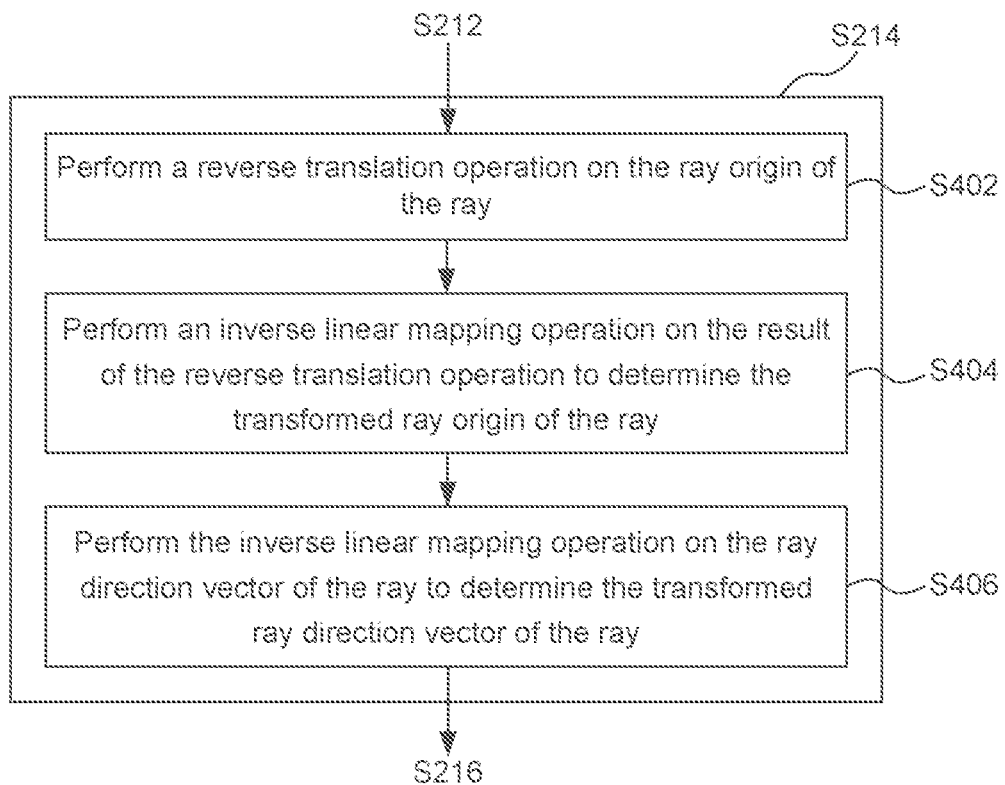
FIG. 4 shows a flow chart for a method of transforming a ray from world space into model space.

We will now describe details of the transformation of the ray data from world space to model space in step S214 with reference to FIGS. 3a, 3b and 4.

FIG. 3a shows a ray 302 passing through a region 304 represented by an instance of a BLAS (i.e. represented by an instance of the root node of the BLAS) within a region 306 represented by a leaf node of a TLAS. FIG. 3a also shows the axes of the world space coordinate system (x, y and z) in which the TLAS is defined, and it can be seen that the region 306 is an axis-aligned box whose edges are aligned to the axes of the world space coordinate system. The region 306 completely bounds the region 304, i.e. the region 304 is wholly contained within the region 306. The ray 302 is defined with components in world space. In other words, the ray is defined as $r_w = O_w + D_w t$ where $O_w$ is a vector $(O_{w,x}, O_{w,y}, O_{w,z})$ which represents the ray origin in world space using components in the world space coordinate system, $D_w$ is a vector $(D_{w,x}, D_{w,y}, D_{w,z})$ which represents the ray direction in world space using components in the world space coordinate system and t represents a distance along the ray from the origin.

FIG. 3b shows the transformed ray 308, which is the same as the ray 302 but it has been transformed into the model space of the BLAS. The transformed ray 308 passes through the region 304 represented by the instance of the BLAS (i.e. represented by the instance of the root node of the BLAS) within the region 306 represented by the leaf node of the TLAS. FIG. 3b also shows the axes of the model space coordinate system (x, y and z) in which the BLAS is defined. It can be seen that the region 304 is an axis-aligned box whose edges are aligned to the axes of the model space coordinate system. The transformed ray 308 is defined with components in model space. In other words, the ray is defined as $r_m = O_m + D_m t$ where $O_m$ is a vector $(O_{m,x}, O_{m,y}, O_{m,z})$ which represents the ray origin in model space using components in the model space coordinate system, $D_m$ is a vector $(D_{m,x}, D_{m,y}, D_{m,z})$ which represents the ray direction in model space using components in the model space coordinate system and t represents a distance along the ray from the origin. For the purposes of matrix multiplication, these two vectors are often considered to be represented in a 4D homogenous coordinate space as $(O_{m,x}, O_{m,y}, O_{m,z}, 1)$ and $(D_{m,x}, D_{m,y}, D_{m,z}, 0)$ respectively, but as the fourth terms are constant, they are not usually stored.

FIG. 4 shows a flow chart for a method of transforming the ray 302 from world space into model space in order to determine the transformed ray 308. Therefore, FIG. 4 illustrates the steps that are performed in step S214.

As described above, the application submitting an instance of a BLAS representing a geometric model to be rendered by the ray tracing unit 102 supplies a forward transformation matrix, M, for performing model-to-world space transformations, so that the instance of the BLAS can be correctly positioned and oriented in the world space. This model-to-world transformation matrix (i.e. the forward transformation matrix, M) can be written as:

$$M = TR = \begin{bmatrix} 1 & 0 & 0 & T_0 \\ 0 & 1 & 0 & T_1 \\ 0 & 0 & 1 & T_2 \\ 0 & 0 & 0 & 1 \end{bmatrix} \begin{bmatrix} R_{00} & R_{01} & R_{02} & 0 \\ R_{10} & R_{11} & R_{12} & 0 \\ R_{20} & R_{21} & R_{22} & 0 \\ 0 & 0 & 0 & 1 \end{bmatrix} = \begin{bmatrix} R_{00} & R_{01} & R_{02} & T_0 \\ R_{10} & R_{11} & R_{12} & T_1 \\ R_{20} & R_{21} & R_{22} & T_2 \\ 0 & 0 & 0 & 1 \end{bmatrix}.$$

In this example, M is a matrix which can be considered to define a linear mapping operation R and a translation T. The matrix M is shown above as a 4×4 matrix, but in a 3D example, the bottom row of the matrix will always be (0, 0, 0, 1), so the matrix can be represented as a 3×4 matrix by omitting the bottom row shown above. In the main examples described herein, the linear mapping operation is a rotation, but in other examples, the linear mapping operation may be something other than a rotation, e.g. any operation which can be represented as an invertible square matrix, such as a scaling, a reflection, a shearing, or a combination thereof. If a user supplies a singular forward transformation matrix (i.e. a non-invertible forward transformation matrix), the model may be transformed into world space rather than transforming rays into the model space for the purposes of intersection testing. A translation is not a linear mapping. The linear mapping operation is represented with a matrix, which is shown above as a 4×4 matrix, $$R = \begin{bmatrix} R_{00} & R_{01} & R_{02} & 0 \\ R_{10} & R_{11} & R_{12} & 0 \\ R_{20} & R_{21} & R_{22} & 0 \\ 0 & 0 & 0 & 1 \end{bmatrix},$$

but in a 3D example the final column and the final row will always be $(0, 0, 0, 1)^T$ and $(0, 0, 0, 1)$ respectively, so the linear mapping operation can be represented as a 3×3 matrix:

$$R = \begin{bmatrix} R_{00} & R_{01} & R_{02} \\ R_{10} & R_{11} & R_{12} \\ R_{20} & R_{21} & R_{22} \end{bmatrix}.$$

The values of $R_{00}$, $R_{01}$, $R_{02}$, $R_{10}$, $R_{11}$, $R_{12}$, $R_{20}$, $R_{21}$ and $R_{22}$ define the linear mapping R. The translation is represented with a matrix, which is shown above as a 4×4 matrix, $$T = \begin{bmatrix} 1 & 0 & 0 & T_0 \\ 0 & 1 & 0 & T_1 \\ 0 & 0 & 1 & T_2 \\ 0 & 0 & 0 & 1 \end{bmatrix},$$

but in a 3D example the first three columns and the final row will always be $(1, 0, 0, 0)^T$, $(0, 1, 0, 0)^T$, $(0, 0, 1, 0)^T$ and $(0, 0, 0, 1)$ respectively, so the translation operation can be represented as a vector with three components:

$$T = \begin{bmatrix} T_0 \\ T_1 \\ T_2 \end{bmatrix}.$$

The values of $T_0$, $T_1$ and $T_2$ define the translation T. The values of $R_{00}$, $R_{01}$, $R_{02}$, $R_{10}$, $R_{11}$, $R_{12}$, $R_{20}$, $R_{21}$, $R_{22}$, $T_0$, $T_1$ and $T_2$ are supplied by the application to thereby define the forward transformation matrix M.

In conventional approaches, if a transformation were to be performed on data from world space into model space then the inverse of the forward transformation matrix could be determined, and then the transformation could be performed on data by performing matrix multiplications on the data using the inverse transformation matrix. If the inverse ($M^{-1}$) of the forward transformation matrix M were determined, it would be determined as:

$$M^{-1} = R^{-1}T^{-1} = \begin{bmatrix} r_{00} & r_{01} & r_{02} & 0 \\ r_{10} & r_{11} & r_{12} & 0 \\ r_{20} & r_{21} & r_{22} & 0 \\ 0 & 0 & 0 & 1 \end{bmatrix} \begin{bmatrix} 1 & 0 & 0 & -T_0 \\ 0 & 1 & 0 & -T_1 \\ 0 & 0 & 1 & -T_2 \\ 0 & 0 & 0 & 1 \end{bmatrix} = \begin{bmatrix} r_{00} & r_{01} & r_{02} & t_0 \\ r_{10} & r_{11} & r_{12} & t_1 \\ r_{20} & r_{21} & r_{22} & t_2 \\ 0 & 0 & 0 & 1 \end{bmatrix},$$

where for $i$ in $\{0, 1, 2\}$  $t_i = -r_{i0}T_0 - r_{i1}T_1 - r_{i2}T_2$, and $\begin{bmatrix} r_{00} & r_{01} & r_{02} & 0 \\ r_{10} & r_{11} & r_{12} & 0 \\ r_{20} & r_{21} & r_{22} & 0 \\ 0 & 0 & 0 & 1 \end{bmatrix} \begin{bmatrix} R_{00} & R_{01} & R_{02} & 0 \\ R_{10} & R_{11} & R_{12} & 0 \\ R_{20} & R_{21} & R_{22} & 0 \\ 0 & 0 & 0 & 1 \end{bmatrix} = I.$ The inverse transformation (i.e. the transformation from world space to model space) is not supplied by the application to the ray tracing unit 102. In other words, the component values of $M^{-1}$ are not supplied by the application. However, the component values of the inverse transformation matrix $M^{-1}$ could be determined from the components values of the forward transformation matrix M (which are supplied by the application), assuming M is invertible. As shown above, the matrix $R^{-1}$ is the inverse of R and can be represented as a 3×3 matrix $$R^{-1} = \begin{bmatrix} r_{00} & r_{01} & r_{02} \\ r_{10} & r_{11} & r_{12} \\ r_{20} & r_{21} & r_{22} \end{bmatrix}.$$

The component values of $R^{-1}$ can be determined by finding the inverse of the matrix R. A skilled person would know how to find the inverse of a matrix. It is noted that if the linear mapping R is a pure rotation then the inverse of the matrix R will be the same as the transpose of the matrix R. Calculating the transpose of a matrix is simple, and in particular it is generally simpler than calculating the inverse of a matrix. If the linear mapping R is not a pure rotation then the inverse of the matrix R will not generally be the same as the transpose of the matrix R, and may be more complicated to calculate. For example, calculating the component values of the matrix $R^{-1}$ may involve dividing values by the determinant of the matrix R, and it is noted that division operations are generally more costly to implement (e.g. in terms of latency, power consumption and silicon area). The matrix $T^{-1}$ is the inverse of T and can be represented as a vector with three components:

$$T^{-1} = \begin{bmatrix} -T_0 \\ -T_1 \\ -T_2 \end{bmatrix}.$$

The component values of $T^{-1}$ can be found by negating the components values of T, i.e. they are the component values of T multiplied by −1. The component values $t_0$, $t_1$ and $t_2$ can be determined by performing the matrix multiplication $R^{-1} T^{-1}$. In particular, as described above, the component value $t_0$ could be calculated as $t_0=-(r_{00}.T_0+r_{01}.T_1+r_{02}.T_2)$; the component value $t_1$ could be calculated as $t_1=-(r_{10}.T_0+r_{11}.T_1+r_{12}.T_2)$; and the component value $t_2$ could be calculated as $t_2=-(r_{20}.T_0+r_{21}.T_1+r_{22}.T_2)$. The matrix $M^{-1}$ is shown above as a 4×4 matrix, but in a 3D example, the bottom row of the matrix will always be (0, 0, 0, 1), so the matrix can be represented as a 3×4 matrix by omitting the bottom row shown above.

Ray origin and direction data could be transformed into model space by multiplying them by the inverse transformation matrix $M^{-1}$. In this way, the ray origin in model space $$O_m = \begin{bmatrix} O_{m,x} \\ O_{m,y} \\ O_{m,z} \end{bmatrix}$$

(which may be represented as a 4D homogenous vector as $$O_m = \begin{bmatrix} O_{m,x} \\ O_{m,y} \\ O_{m,z} \\ 1 \end{bmatrix})$$

would be calculated from the inverse matrix $M^{-1}$ and the ray origin in world space $$O_w = \begin{bmatrix} O_{w,x} \\ O_{w,y} \\ O_{w,z} \end{bmatrix}$$

(which may be represented as a 4D homogenous vector as $$O_w = \begin{bmatrix} O_{w,x} \\ O_{w,y} \\ O_{w,z} \\ 1 \end{bmatrix})$$

as:

$$O_m = \begin{bmatrix} O_{m,x} \\ O_{m,y} \\ O_{m,z} \\ 1 \end{bmatrix} = \begin{bmatrix} r_{00} & r_{01} & r_{02} & t_0 \\ r_{10} & r_{11} & r_{12} & t_1 \\ r_{20} & r_{21} & r_{22} & t_2 \\ 0 & 0 & 0 & 1 \end{bmatrix} \begin{bmatrix} O_{w,x} \\ O_{w,y} \\ O_{w,z} \\ 1 \end{bmatrix}.$$

Similarly, the ray direction in model space $$D_m = \begin{bmatrix} D_{m,x} \\ D_{m,y} \\ D_{m,z} \end{bmatrix}$$

(which may be represented as a 4D homogenous vector as $$D_m = \begin{bmatrix} D_{m,x} \\ D_{m,y} \\ D_{m,z} \\ 0 \end{bmatrix})$$

would be calculated from the inverse matrix $M^{-1}$ and the ray direction in world space $$D_w = \begin{bmatrix} D_{w,x} \\ D_{w,y} \\ D_{w,z} \end{bmatrix}$$

(which may be represented as a 4D homogenous vector as $$D_w = \begin{bmatrix} D_{w,x} \\ D_{w,y} \\ D_{w,z} \\ 0 \end{bmatrix})$$

as:

$$D_m = \begin{bmatrix} D_{m,x} \\ D_{m,y} \\ D_{m,z} \\ 0 \end{bmatrix} = \begin{bmatrix} r_{00} & r_{01} & r_{02} & t_0 \\ r_{10} & r_{11} & r_{12} & t_1 \\ r_{20} & r_{21} & r_{22} & t_2 \\ 0 & 0 & 0 & 1 \end{bmatrix} \begin{bmatrix} D_{w,x} \\ D_{w,y} \\ D_{w,z} \\ 0 \end{bmatrix}.$$

It is noted that the fourth component of a position vector (e.g. the ray origin) is 1, whereas the fourth component of a direction vector (e.g. the ray direction vector) is 0. This means that the translation part of a transformation matrix affects position vectors but does not affect direction vectors. It is also noted that when a ray is transformed, it is just the ray origin vector and the ray direction vector that change, i.e. other attributes of the ray (e.g. the minimum and maximum culling distances for the ray) are not altered by the transformation.

The calculation and use of the inverse matrix $M^{-1}$ is the conventional approach for transforming data from world space to model space. Matrix multiplication is the normal approach for transforming data between different spaces, so this approach is familiar to people skilled in the art. Furthermore, this matrix multiplication approach is suitable for using fused multiply-add (FMA) units, in which it can be more efficient to implement multiply and add operations as A*B+C rather than as (B+C')*A, where C'=C/A. For example, the matrix multiplication approach may involve nine multiply and add operations to transform a vector with three spatial components from a first space to a second space. It is not generally known that there may be problems with this matrix multiplication approach.

However, as described herein, the calculation and use of the inverse matrix $M^{-1}$ can cause errors in the transformation process, e.g. due to rounding and/or due to the finite precision with which values can be represented, as described above with reference to the examples shown in the tables of FIGS. 7a, 7b and 7c. These errors (in terms of the absolute sense) tend to be small (although sometimes they can be magnified, e.g. due to dividing numbers by very small values), but the inventors have realised that even small errors can prove to be very detrimental when they are part of an intersection testing process in a ray tracing system. For example, if the errors are large enough to cause a determination that a ray does not intersect a box or a polygon, when a perfectly accurate calculation would have determined that the ray does intersect the box or polygon, then this can cause rendering errors in an image of a scene that is rendered. These rendering errors can be very noticeable (e.g. an error could mean that a ray is not found to intersect a blue object, and instead is found to intersect a red object behind the blue object, such that a pixel appears red rather than blue in the rendered image), and as such these rendering errors are generally not acceptable. As another example, even very small errors can cause "self intersections", which result when a secondary ray, launched from the surface of a primitive, hits that same primitive (or a very close neighbour) because of the errors. These self intersections can cause rendering artefacts which are sometimes described as "surface acne". Improving the accuracy of the transformation process can therefore be very beneficial to the ray tracing system in terms of reducing the likelihood of rendering errors occurring, or reducing the need to put other measures in place to avoid rendering errors. Furthermore, reducing the cost of the transformation process (e.g. in terms of latency, power consumption and silicon area) is also beneficial because there are generally competing aims of reducing the latency, power consumption and silicon area of the ray tracing unit 102.

Therefore, according to examples described herein, in step S214, rather than calculating the inverse transformation matrix $M^{-1}$ and using it to perform the transformations as in the standard approach taught in computer graphics, the method shown in FIG. 4 is used. In this method the world-to-model space transformation of the ray origin is performed in two steps. In particular, the world-to-model space transformation of the ray origin is decomposed into: (i) inverse translation in step S402, and then (ii) inverse linear mapping (e.g. inverse rotation) in step S404. Decomposing the transformation into these two steps is generally more accurate (i.e. results in smaller errors) than the standard matrix multiplication approach. It is noted that the approach described herein of decomposing the transformation into the two steps may or may not be more efficient (e.g. in terms of processing latency and/or power consumption) than the standard matrix multiplication approach when one considers the availability of Fused Multiply Add operations, but any slight overhead in efficiency is normally outweighed by the improvements in accuracy provided by the approach in which the transformation is decomposed into the two steps.

In step S402, the intersection testing module 108 (specifically the transform unit 118 in this example) performs a reverse translation operation on the ray origin of the ray. The reverse translation operation is the reverse of the translation T defined by the forward transformation matrix M. In this way, the world space ray origin $O_w$ is first translated by subtracting the model-to-world translation components from the world space ray origin components. In particular, an intermediate ray origin $O'_m$ is determined as $$O'_m = \begin{bmatrix} O'_{m.x} \\ O'_{m.y} \\ O'_{m.z} \\ 1 \end{bmatrix} = \begin{bmatrix} 1 & 0 & 0 & -T_0 \\ 0 & 1 & 0 & -T_1 \\ 0 & 0 & 1 & -T_2 \\ 0 & 0 & 0 & 1 \end{bmatrix} \begin{bmatrix} O_{w.x} \\ O_{w.y} \\ O_{w.z} \\ 1 \end{bmatrix}.$$

The result of the reverse translation operation in step S402 is intermediate data, e.g. the intermediate ray origin $O'_m$. The translation performed in step S402 may be described as the "reverse", the "inverse", or the "negated version" of the translation defined by the forward transformation matrix.

It is noted that, although this inverse translation operation is represented using a 4×4 matrix representation of the inverse translation matrix $T^{-1}$, since the first three columns and the final row of $T^{-1}$ are $(1, 0, 0, 0)^T$, $(0, 1, 0, 0)^T$, $(0, 0, 1, 0)^T$ and $(0, 0, 0, 1)$ respectively, the operation of step S402 could be represented as:

$$O'_m = \begin{bmatrix} O'_{m.x} \\ O'_{m.y} \\ O'_{m.z} \end{bmatrix} = \begin{bmatrix} O_{w.x} \\ O_{w.y} \\ O_{w.z} \end{bmatrix} - \begin{bmatrix} T_0 \\ T_1 \\ T_2 \end{bmatrix}.$$

Then in step S404, the intersection testing module 108 (specifically the transform unit 118 in this example) performs an inverse linear mapping operation on the result of the reverse translation operation. In other words, an inverse linear mapping operation is performed on the intermediate data that is the result of the reverse translation operation performed in step S402. The inverse linear mapping is the inverse of the linear mapping R defined by the forward transformation matrix M. For example, the ray origin in model space $O_m$ is calculated from the inverse linear mapping matrix $R^{-1}$ and the intermediate ray origin $O'_m$ as:

$$O_m = \begin{bmatrix} O_{m.x} \\ O_{m.y} \\ O_{m.z} \\ 1 \end{bmatrix} = \begin{bmatrix} r_{00} & r_{01} & r_{02} & 0 \\ r_{10} & r_{11} & r_{12} & 0 \\ r_{20} & r_{21} & r_{22} & 0 \\ 0 & 0 & 0 & 1 \end{bmatrix} \begin{bmatrix} O'_{m.x} \\ O'_{m.y} \\ O'_{m.z} \\ 1 \end{bmatrix}.$$

It is noted that, although this inverse linear mapping operation is represented using a 4×4 matrix representation of the inverse linear mapping matrix $R^{-1}$, since the final column and final row of the inverse linear mapping matrix are $(0, 0, 0, 1)^T$ and $(0, 0, 0, 1)$ respectively, this operation could be represented with a 3×3 inverse linear mapping matrix as:

$$O_m = \begin{bmatrix} O_{m.x} \\ O_{m.y} \\ O_{m.z} \end{bmatrix} = \begin{bmatrix} r_{00} & r_{01} & r_{02} \\ r_{10} & r_{11} & r_{12} \\ r_{20} & r_{21} & r_{22} \end{bmatrix} \begin{bmatrix} O'_{m.x} \\ O'_{m.y} \\ O'_{m.z} \end{bmatrix}.$$

As described above, the components of the inverse linear mapping matrix $R^{-1}$ are determined by calculating the inverse of the forward linear mapping matrix R.

Steps S402 and S404 are performed as separate operations, e.g. they might not be part of a single matrix multiply operation. In other words, steps S402 and S404 are the steps of a two-step process for performing a world-to-model space transformation.

The world space ray direction vector $D_w$ does not undergo any translation in the transformation, but the inverse linear mapping is applied to the world space ray direction vector $D_w$. In particular, in step S406, the intersection testing module 108 (specifically the transform unit 118 in this example) performs a transformation on the ray direction vector of the ray $D_w$ from the world space to the model space by performing the inverse linear mapping operation (e.g. defined by the inverse rotation matrix $R^{-1}$) on the ray direction vector of the ray. For example, the ray direction in model space $D_m$ is calculated from the inverse linear mapping matrix $R^{-1}$ and the ray direction in world space $D_w$ as:

$$D_m = \begin{bmatrix} D_{m.x} \\ D_{m.y} \\ D_{m.z} \\ 0 \end{bmatrix} = \begin{bmatrix} r_{00} & r_{01} & r_{02} & 0 \\ r_{10} & r_{11} & r_{12} & 0 \\ r_{20} & r_{21} & r_{22} & 0 \\ 0 & 0 & 0 & 1 \end{bmatrix} \begin{bmatrix} D_{w.x} \\ D_{w.y} \\ D_{w.z} \\ 0 \end{bmatrix}.$$

It is noted that, although this inverse linear mapping operation is represented using a 4×4 matrix representation of the inverse linear mapping matrix $R^{-1}$, since the final column and final row of the inverse linear mapping matrix are $(0, 0, 0, 1)^T$ and $(0, 0, 0, 1)$ respectively, this operation could be represented with a 3×3 inverse linear mapping matrix as:

$$D_m = \begin{bmatrix} D_{m.x} \\ D_{m.y} \\ D_{m.z} \end{bmatrix} = \begin{bmatrix} r_{00} & r_{01} & r_{02} \\ r_{10} & r_{11} & r_{12} \\ r_{20} & r_{21} & r_{22} \end{bmatrix} \begin{bmatrix} D_{w.x} \\ D_{w.y} \\ D_{w.z} \end{bmatrix}.$$

Following step S406, the method continues to step S216 as described above. In this way, intersection testing can be performed using the transformed data (e.g. the transformed ray origin $O_m$ and the transformed ray direction vector $D_m$) for use in rendering an image of the scene.

The forward transformation (from the model space to the world space) and the inverse transformation (from the world space to the model space) are affine transformations.

As mentioned above, decomposing the transformation of the ray origin into two steps (translation and then linear mapping) increases the accuracy of the world to model space transformation, compared to calculating and using the inverse transformation matrix $M^{-1}$. An explanation of why this increases the accuracy is now provided, in which, for clarity of explanation, the scene is reduced from a 3D scene to a 2D scene.

In a 2D example, the forward transformation matrix $M$ has the form $$M = \begin{bmatrix} a & b & x \\ c & d & y \\ 0 & 0 & 1 \end{bmatrix}.$$

This can be considered to represent a linear mapping R and a translation T, i.e. $M=TR$, where $$R = \begin{bmatrix} a & b & 0 \\ c & d & 0 \\ 0 & 0 & 1 \end{bmatrix},$$

which could just be represented as $$R = \begin{bmatrix} a & b \\ c & d \end{bmatrix},$$

and where $$T = \begin{bmatrix} 1 & 0 & x \\ 0 & 1 & y \\ 0 & 0 & 1 \end{bmatrix},$$

which could just be represented as $$T = \begin{bmatrix} x \\ y \end{bmatrix}.$$

With the conventional approach of determining the inverse transformation matrix $M^{-1}$ and then performing matrix multiplication operations to perform the inverse transformation, the inverse transformation matrix $M^{-1}$ would be calculated as:

$$M^{-1} = R^{-1}T^{-1} = \begin{bmatrix} \frac{d}{e} & -\frac{b}{e} & 0 \\ -\frac{c}{e} & \frac{a}{e} & 0 \\ 0 & 0 & 1 \end{bmatrix} \begin{bmatrix} 1 & 0 & -x \\ 0 & 1 & -y \\ 0 & 0 & 1 \end{bmatrix} = \begin{bmatrix} \frac{d}{e} & -\frac{b}{e} & \frac{(-dx+by)}{e} \\ -\frac{c}{e} & \frac{a}{e} & \frac{(cx-ay)}{e} \\ 0 & 0 & 1 \end{bmatrix},$$

which could be represented as a 2×3 matrix, i.e. as $$M^{-1} = \begin{bmatrix} \frac{d}{e} & -\frac{b}{e} & \frac{(-dx+by)}{e} \\ -\frac{c}{e} & \frac{a}{e} & \frac{(cx-ay)}{e} \end{bmatrix},$$

where e is the determinant of M, i.e. $e=(ad-bc)$.

In contrast, with the two-step approach described with reference to the flow chart of FIG. 4, the inverse translation is performed first using the matrix $$T^{-1} = \begin{bmatrix} 1 & 0 & -x \\ 0 & 1 & -y \\ 0 & 0 & 1 \end{bmatrix},$$

which could just be represented as a vector $$T^{-1} = \begin{bmatrix} -x \\ -y \end{bmatrix},$$

and then the inverse linear mapping is performed using the matrix $$R^{-1} = \begin{bmatrix} \frac{d}{e} & -\frac{b}{e} & 0 \\ -\frac{c}{e} & \frac{a}{e} & 0 \\ 0 & 0 & 1 \end{bmatrix},$$

which could just be represented as $$R^{-1} = \begin{bmatrix} \frac{d}{e} & -\frac{b}{e} \\ -\frac{c}{e} & \frac{a}{e} \end{bmatrix}.$$

It can be seen that any errors that are introduced (e.g. due to rounding) will affect the inverse translation portion of the $M^{-1}$ matrix in the conventional approach (which has values calculated as $$\frac{(-dx+by)}{e} \text{ and } \frac{(cx-ay)}{e})$$

more than they will affect the inverse translation $T^{-1}$ in the two-step approach (which has values of $-x$ and $-y$). As mentioned above, the precision with which data values can be represented is finite and depends upon the format of the data values. Furthermore, the data values may have a floating point format, wherein the difference between consecutive representable numbers in a floating point format increases as the magnitude of the numbers increases. Therefore, if the data values are represented in a floating point format then, as the magnitude of the data values increases, the precision with which the data values can be represented decreases. In other words, for floating point data values, the rounding errors tend to increase in magnitude as the magnitude of the data values increases. For example, it is possible that the determinant of the forward transformation matrix, e, could be very small. This will happen when ad≈bc because e=(ad−bc). This is referred to as "catastrophic cancellation". As mentioned above, the errors in the results of the multiplications to determine values of ad and bc increase as the magnitude of the values increases, e.g. the errors may be proportional to the size of the values of ad and bc. The error in the value of e is an accumulation of the errors in the values of ad and bc. As such, if the values of ad and bc are large but the value of e is relatively small, the relative error in e (i.e. the magnitude of the error in e relative to the magnitude of e) can become very large. In this situation, the calculations to determine the values of $$\frac{(-dx+by)}{e} \text{ and } \frac{(cx-ay)}{e}$$

could result in large errors, which could mean in the conventional approach that the inverse translation portion of the $M^{-1}$ matrix may have a relatively large error. Large errors can also appear when dx≈by or cx≈ay. As another example, in the traditional matrix multiplication approach, the world space ray origin is subtracted from a transformed origin for the instance of the geometric model. If, for a given ray, the ray origin is close to the transformed origin for the instance of the geometric model in world space, then we will get more of the "catastrophic cancellation" issues, leading to larger (potentially huge) relative errors. In contrast, the inverse translation $T^{-1}$ in the two-step approach (which has values of $-x$ and $-y$) has zero error, e.g. the values of $-x$ and $-y$ can be determined by simply inverting the sign bit of the values of x and y from the received forward transformation matrix.

The ray tracing system 100 receives the forward transformation matrix M, where M=TR, which defines the mapping from model space to world space. To perform an inverse transformation (from world space to model space) the ray tracing system 100 determines $T^{-1}$ (e.g. by simply flipping the sign bits of the components of T, which is trivial to implement) and $R^{-1}$ (e.g. by calculating the inverse of R). However, it is noted that the ray tracing system 100 does not need to calculate the inverse transformation matrix $M^{-1}$ (although in some examples it may calculate the inverse transformation matrix $M^{-1}$ because this could be useful for other purposes, e.g. for use by a shader program executed on the processing logic 110).

It can be appreciated from the explanation given above that it is simpler to calculate the inverse translation portion of the inverse transformation when the two-step technique is used compared to when the conventional approach is used, e.g. with reference to the 2D example given above, it is simpler to calculate $-x$ and $-y$ than it is to calculate $$\frac{(-dx+by)}{e} \text{ and } \frac{(cx-ay)}{e}.$$

In the examples described above, the data that is to be transformed is ray data, e.g. a ray origin. More generally, where a forward transformation indication has been supplied defining a transformation from a first space (e.g. model space) to a second space (e.g. world space), the two-step transformation technique described herein (in which a reverse translation is performed and then an inverse linear mapping is performed on the results of the reverse translation) could be performed on any data (which may be referred to herein as "input data") which represents a position in the second space (e.g. world space) to determine transformed data which represents a transformed position in the first space (e.g. model space). For example, the input data could be any data stored in world space that might be transformed to model space, e.g. for shading. For example, the input data could represent a position of a light source in the second space (e.g. world space), and the transformed data could represent a transformed position of the light source in the first space (e.g. model space).

Furthermore, in general, the forward transformation is from a first space to a second space, and the inverse transformation is from the second space to the first space. In the examples described above the second space is a world space of a scene to be rendered and the first space is a model space of a geometric model which is instanced within the scene. However, more generally, the first and second spaces could represent any spaces between which data is to be transformed.

The examples described herein relate to a method of processing data in a ray tracing system. The same principles could be applied to methods of processing data in a computing system, such as a graphics processing system.

Figure 5:
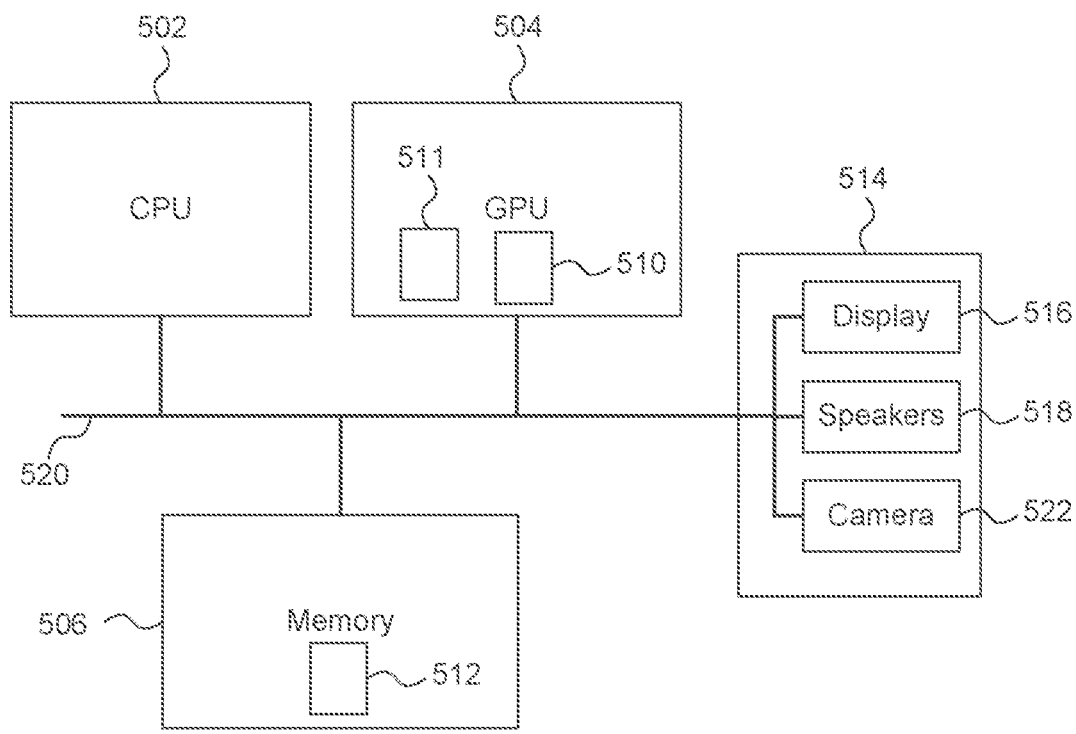
FIG. 5 shows a computer system in which a ray tracing unit is implemented.

FIG. 5 shows a computer system in which the ray tracing systems described herein may be implemented. The computer system comprises a CPU 502, a GPU 504, a memory 506 and other devices 514, such as a display 516, speakers 518 and a camera 522. A ray tracing unit 510 (corresponding to ray tracing unit 102) is implemented on the GPU 504, as well as a Neural Network Accelerator (NNA) 511. In other examples, the ray tracing unit 510 may be implemented on the CPU 502 or within the NNA 511 or as a separate processing unit in the computer system. The components of the computer system can communicate with each other via a communications bus 520. A store 512 (corresponding to memory 104) is implemented as part of the memory 506.

The ray tracing system of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a ray tracing system need not be physically generated by the ray tracing system at any point and may merely represent logical values which conveniently describe the processing performed by the ray tracing system between its input and output.

The ray tracing units, and specifically the intersection testing modules described herein may be embodied in hardware on an integrated circuit. The ray tracing units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a ray tracing unit configured to perform any of the methods described herein, or to manufacture a ray tracing unit comprising any apparatus described herein. An integrated circuit definition dataset may be, for example, an integrated circuit description.

Therefore, there may be provided a method of manufacturing, at an integrated circuit manufacturing system, a ray tracing unit as described herein. Furthermore, there may be provided an integrated circuit definition dataset that, when processed in an integrated circuit manufacturing system, causes the method of manufacturing a ray tracing unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a ray tracing unit will now be described with respect to FIG. 6.

Figure 6:
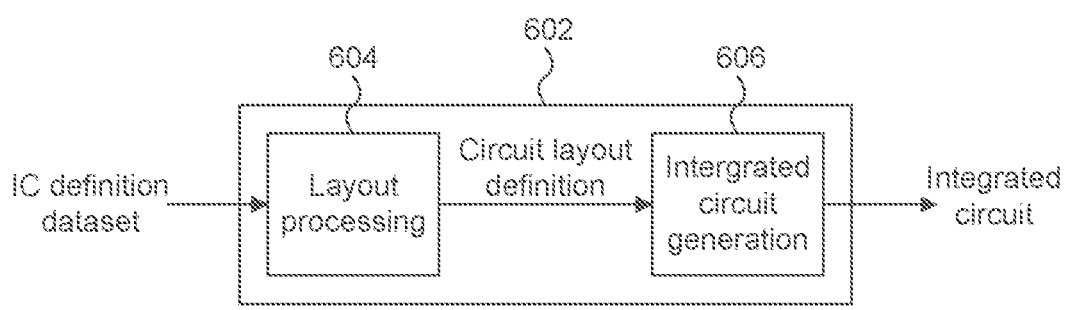
FIG. 6 shows an integrated circuit manufacturing system for generating an integrated circuit embodying a ray tracing unit.

FIG. 6 shows an example of an integrated circuit (IC) manufacturing system 602 which is configured to manufacture a ray tracing unit as described in any of the examples herein. In particular, the IC manufacturing system 602 comprises a layout processing system 604 and an integrated circuit generation system 606. The IC manufacturing system 602 is configured to receive an IC definition dataset (e.g. defining a ray tracing unit as described in any of the examples herein), process the IC definition dataset, and generate an IC according to the IC definition dataset (e.g. which embodies a ray tracing unit as described in any of the examples herein). The processing of the IC definition dataset configures the IC manufacturing system 602 to manufacture an integrated circuit embodying a ray tracing unit as described in any of the examples herein.

The layout processing system 604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 604 has determined the circuit layout it may output a circuit layout definition to the IC generation system 606. A circuit layout definition may be, for example, a circuit layout description.

The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a ray tracing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of processing data in a ray tracing system, the method comprising:
    receiving a forward transformation indication defining a transformation from a first space to a second space;
    performing a transformation on input data from the second space to the first space to determine transformed data by:
        decomposing the forward transformation indication into a translation and a linear mapping,
        determining a reverse translation operation by finding the reverse of the translation decomposed from the forward transformation indication,
        determining an inverse linear mapping operation by finding the inverse of the linear mapping decomposed from the forward transformation indication,
        performing the reverse translation operation on the input data, and
        performing the inverse linear mapping operation on the result of the reverse translation operation; and
    processing the transformed data in the ray tracing system, comprising performing intersection testing using the transformed data for use in rendering an image of a scene.

2. The method of claim 1, wherein the second space is a world space of a scene to be rendered and the first space is a model space of a geometric model which is instanced within the scene.

3. The method of claim 2, further comprising performing intersection testing on a ray against a top-level acceleration structure, wherein the top-level acceleration structure comprises nodes representing respective regions defined in the world space, wherein a leaf node of the top-level acceleration structure references a bottom-level acceleration structure comprising one or more nodes representing a respective one or more regions defined in the model space, and wherein the input data represents a ray origin of the ray in the world space;
    wherein said performing a transformation on the ray origin of the ray from the world space to the model space to thereby determine a transformed ray origin of the ray in the model space, is performed in response to determining that the ray intersects the leaf node of the top-level acceleration structure;

wherein said processing the transformed data in the ray tracing system comprises performing intersection testing on the ray against the bottom-level acceleration structure using the transformed ray origin of the ray in the model space.

4. The method of claim 3, wherein the respective regions that are represented by the nodes of the top-level acceleration structure are axis-aligned boxes whose edges are aligned to the axes of a world space coordinate system in which the world space is defined, and wherein the respective one or more regions that are represented by the one or more nodes of the bottom-level acceleration structure are axis-aligned boxes whose edges are aligned to the axes of a model space coordinate system in which the model space is defined.

5. The method of claim 1, wherein the input data represents a position in the second space, and wherein the transformed data represents a transformed position in the first space.

6. The method of claim 1, wherein the input data represents a ray origin of a ray in the second space.

7. The method of claim 6, further comprising performing a transformation on a ray direction vector of the ray from the second space to the first space by performing the inverse linear mapping operation on the ray direction vector of the ray.

8. The method of claim 1, wherein the linear mapping comprises one or more of: (i) a rotation, (ii) a scaling, (iii) a reflection, and (iv) a shearing.

9. The method of claim 1, wherein the forward transformation indication comprises a forward transformation matrix defining the transformation from the first space to the second space.

10. The method of claim 1, further comprising determining the inverse linear mapping operation by calculating the inverse of the linear mapping defined in the forward transformation indication.

11. The method of claim 1, wherein the input data represents a position of a light source in the second space.

12. The method of claim 1, wherein the method of processing data is performed without calculating an inverse transformation matrix defining a transformation from the second space to the first space.

13. A ray tracing system configured to receive a forward transformation indication defining a transformation from a first space to a second space, the ray tracing system comprising:
an intersection testing module, including a transform unit configured to perform a transformation on input data from the second space to the first space to determine transformed data by:
decomposing the forward transformation indication into a translation and a linear mapping,
determining a reverse translation operation by finding the reverse of the translation decomposed from the forward transformation indication,
determining an inverse linear mapping operation by finding the inverse of the linear mapping decomposed from the forward transformation indication,
performing the reverse translation operation on the input data, and
performing the inverse linear mapping operation on the result of the reverse translation operation; and
one or more intersection testing units configured to perform intersection testing using the transformed data for use in rendering an image of a scene.

14. The ray tracing system of claim 13, wherein the second space is a world space of a scene to be rendered and the first space is a model space of a geometric model which is instanced within the scene, wherein the input data represents a ray origin of a ray in the world space, and wherein the transformed data represents a transformed ray origin of the ray in the model space.

15. The ray tracing system of claim 14, wherein the transform unit is further configured to perform a transformation on a ray direction vector of the ray from the world space to the model space by performing the inverse linear mapping operation on the ray direction vector of the ray.

16. The ray tracing system of claim 13, wherein the second space is a world space of a scene to be rendered and the first space is a model space of a geometric model which is instanced within the scene, wherein the input data represents a ray origin of a ray in the world space, wherein the transformed data represents a transformed ray origin of the ray in the model space;
wherein the intersection testing module is configured to perform intersection testing on the ray against a top-level acceleration structure, wherein the top-level acceleration structure comprises nodes representing respective regions defined in the world space, wherein a leaf node of the top-level acceleration structure references a bottom-level acceleration structure comprising one or more nodes representing a respective one or more regions defined in the model space;
wherein the intersection testing module is configured to cause the transform unit to transform the ray origin of the ray from the world space to the model space in response to determining that the ray intersects the leaf node of the top-level acceleration structure; and
wherein the intersection testing module is configured to perform intersection testing on the ray against the bottom-level acceleration structure using the transformed ray origin of the ray in the model space.

17. The ray tracing system of claim 13, further comprising processing logic configured to process intersection testing results to determine rendered values representing an image of a scene.

18. The ray tracing system of claim 13, further comprising a processing module configured to:
receive geometric data defining geometry in the scene; and
generate a hierarchical acceleration structure based on the received geometric data for use in intersection testing.

19. The ray tracing system of claim 13, wherein the transform unit is configured to perform the transformation on input data from the second space to the first space without calculating an inverse transformation matrix defining a transformation from the second space to the first space.

20. A non-transitory computer readable storage medium having stored thereon an integrated circuit definition dataset that, when processed in an integrated circuit manufacturing system, causes the integrated circuit manufacturing system to manufacture a ray tracing system which is configured to receive a forward transformation indication defining a transformation from a first space to a second space, the ray tracing system comprising:
an intersection testing module, including a transform unit configured to perform a transformation on input data from the second space to the first space to determine transformed data by:
decomposing the forward transformation indication into a translation and a linear mapping, determining a reverse translation operation by finding the reverse of the translation decomposed from the forward transformation indication, determining an inverse linear mapping by finding the inverse of the linear mapping decomposed from the forward transformation indication, performing the reverse translation operation on the input data, and performing the inverse linear mapping operation on the result of the reverse translation operation; and one or more intersection testing units configured to perform intersection testing using the transformed data for use in rendering an image of a scene.

* * * * *